(12) United States Patent
Choi et al.

(10) Patent No.: US 10,315,566 B2
(45) Date of Patent: Jun. 11, 2019

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Sunghwan Choi, Seoul (KR); Ilwan Kim, Seoul (KR); Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 15/451,032

(22) Filed: Mar. 6, 2017

(65) Prior Publication Data

US 2017/0253181 A1    Sep. 7, 2017

Related U.S. Application Data

(60) Provisional application No. 62/304,340, filed on Mar. 7, 2016.

(30) Foreign Application Priority Data

Jan. 4, 2017   (WO) ................ PCT/KR2017/000112

(51) Int. Cl.
*B60Q 9/00* (2006.01)
*B60R 1/00* (2006.01)
(Continued)

(52) U.S. Cl.
CPC .............. *B60Q 9/008* (2013.01); *B60K 35/00* (2013.01); *B60R 1/00* (2013.01); *G02B 27/0101* (2013.01);
(Continued)

(58) Field of Classification Search
CPC .... G06F 3/04817; G06T 11/00; G06T 11/001; G09G 2380/10; G09G 3/02; G09G 5/377;
(Continued)

(56) References Cited

U.S. PATENT DOCUMENTS

2008/0246843 A1   10/2008   Nagata et al.
2015/0015712 A1*  1/2015   Sempuku ............... G08G 1/165
                                                      348/148

(Continued)

FOREIGN PATENT DOCUMENTS

JP   2005-199992 A   7/2005
JP   2010-70078 A    4/2010
(Continued)

*Primary Examiner* — Jeffery A Brier
(74) *Attorney, Agent, or Firm* — Birch, Stewart, Kolasch & Birch, LLP

(57) ABSTRACT

The present invention relates to a vehicle control device mounted on a vehicle, and a method for controlling the vehicle. The vehicle control device includes a communication module configured to receive driving information regarding the vehicle, a display module configured to output visual information on a display region formed on a windshield of the vehicle, and a controller configured to control the display module based on the driving information to output graphic objects guiding a path of driving of the vehicle on a first region of the display region, the display region divided into the first region and a second region. The controller controls the display module based on the driving information to output on the second region at least one of the graphic objects output on the first region.

18 Claims, 23 Drawing Sheets

(51) Int. Cl.
  *G06F 3/14*    (2006.01)
  *G09G 3/00*    (2006.01)
  *G09G 3/02*    (2006.01)
  *G09G 5/00*    (2006.01)
  *B60K 35/00*   (2006.01)
  *G02B 27/01*   (2006.01)
  *G06T 11/00*   (2006.01)
  *G06F 3/0481*  (2013.01)

(52) U.S. Cl.
  CPC .............. *G06F 3/14* (2013.01); *G06T 11/00* (2013.01); *G09G 3/002* (2013.01); *G09G 3/02* (2013.01); *B60K 2350/1028* (2013.01); *B60K 2350/1068* (2013.01); *B60K 2350/2052* (2013.01); *B60K 2350/352* (2013.01); *B60R 2300/205* (2013.01); *B60R 2300/301* (2013.01); *B60R 2300/305* (2013.01); *B60R 2300/8093* (2013.01); *G02B 2027/014* (2013.01); *G02B 2027/0141* (2013.01); *G06F 3/04817* (2013.01); *G09G 5/00* (2013.01); *G09G 2340/0464* (2013.01); *G09G 2340/14* (2013.01); *G09G 2380/10* (2013.01)

(58) Field of Classification Search
  CPC .............. G09G 5/38; B60R 2300/205; B60R 2300/305; B60R 2300/8093
  See application file for complete search history.

(56) References Cited

U.S. PATENT DOCUMENTS

| 2016/0003636 A1* | 1/2016 | Ng-Thow-Hing | H04N 7/188 701/26 |
| 2017/0352277 A1* | 12/2017 | Lee | G08G 1/166 |
| 2018/0165838 A1* | 6/2018 | Ganesh | G06T 11/00 |

FOREIGN PATENT DOCUMENTS

| JP | 2013-112269 A | 6/2013 |
| JP | 2015-168266 A | 9/2015 |

* cited by examiner

FAR

[CONSTANT-SPEED DRIVING]

[FIRST ACCELERATION STAGE]

[SECOND ACCELERATION STAGE]

[FIRST DECELERATION STAGE DUE TO FRONT RISK]

[SECOND DECELERATION STAGE DUE TO FRONT RISK]

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119, this application claims the benefit of an earlier filing date of and the right of priority to U.S. Provisional Application No. 62/304,340, filed on Mar. 7, 2016 and also claims the benefit of International Application No. PCT/KR2017/000112, filed on Jan. 4, 2017, the contents of which are incorporated by reference herein in their entirety.

BACKGROUND OF THE INVENTION

1. Field of the Invention

This specification relates to a vehicle control device mounted on a vehicle and a method for controlling the vehicle.

2. Background of the Invention

A vehicle is an apparatus which can be driven by a user who gets therein in a desired direction, and representative examples may be a car and a motorcycle.

For safety and convenience of a user using a vehicle, various sensors and devices are equipped in the vehicle and functions of the vehicle are diversified.

The functions of the vehicle may be divided into a convenience function for promoting a driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safety of the driver and/or pedestrians, and may include various functions, such as a lane departure warning system (LDWS), a lane keeping assist system (LKAS), an autonomous emergency braking (AEB), and the like.

To support and increase such functions of the vehicle, a head up display (HUD) is under development.

The HUD projects a virtual image on a windshield of the vehicle. For example, navigation information for guiding speed of the vehicle or navigating a path up to a destination may be output as a virtual image on the windshield.

When the HUD is equipped on the vehicle, a driver can get driving-related information even while viewing a currently-driving road, and thus concentrate on a traffic condition. Accordingly, the driver's burden of having to alternately gaze a dashboard and the road is reduced, and thus the HUD contributes to a reduction of the driver's fatigue and driving safety.

The HUD projects light emitted from a light source such as an LED array on a thin film transistor (TFT) of generating an image, and thus the image generated in the TFT is projected on a windshield and output in a state of floating in a space above a front road surface. Therefore, the driver can check necessary driving information while gazing the front.

With the development of the HUD, the HUD is configured to output a virtual image on a considerable portion of the windshield. Accordingly, even though the HUD has been developed for enhancing driving concentration, the driving concentration is instead lowered due to the virtual image output on the HUD.

SUMMARY OF THE INVENTION

Therefore, the present invention is to solve the aforementioned problems and other drawbacks.

An aspect of the detailed description is to provide a vehicle control device capable of intuitively providing necessary information to a driver even without interfering with the driver, a vehicle having the vehicle control device, and a method for controlling the vehicle.

Another aspect of the detailed description is to provide a vehicle control device, capable of effectively providing information, to which a driver has to pay attention, using a virtual image, in spite of a limit of a screen size caused due to a limitation of a display module itself.

Another aspect of the detailed description is to provide a vehicle control device capable of navigating a direction to drive accurately and even dynamically.

To achieve these and other advantages and in accordance with the purpose of this specification, as embodied and broadly described herein, there is provided a vehicle control device, including a communication module configured to receive driving information regarding the vehicle, a display module configured to output visual information on a display region formed on a windshield of the vehicle, and a controller configured to control the display module based on the driving information to output graphic objects guiding a path of driving of the vehicle on a first region of the display region, the display region divided into the first region and a second region, wherein the controller controls the display module based on the driving information to output on the second region at least one of the graphic objects output on the first region.

In one embodiment disclosed herein, the controller may control the display module to output on the first region a first graphic object notifying collision probability with an object located outside the vehicle when the collision probability meets a first reference.

In one embodiment disclosed herein, the controller may control the display module to output on the second region a second graphic object notifying the collision probability when the collision probability meets a second reference different from the first reference.

In one embodiment disclosed herein, the first graphic object may disappear from the first region when the collision probability meets the second reference.

In one embodiment disclosed herein, a warning image notifying an orientation of the object may be output on an edge of the second region when the first graphic object is output on the first region.

In one embodiment disclosed herein, an output position of the warning image may change according to a position of the object.

In one embodiment disclosed herein, the warning image may be output on an upper end of the edge of the second region when the object is located at the front of the vehicle, and output on a lower end of the edge of the second region when the object is located at the rear of the vehicle.

In one embodiment disclosed herein, at least one of a color, a flickering frequency and a size of the warning image may gradually change according to the collision probability.

In one embodiment disclosed herein, the controller may control the display module to output an additional warning image on a part of the display region, which overlaps the object, when the object is located within a virtual region defined by the display region and a driver's gaze.

In one embodiment disclosed herein, the second graphic object may disappear from the second region when the additional warning image is output while the second graphic object is output on the second region.

In one embodiment disclosed herein, the controller may control the display module to output on the first region a first notification icon notifying an event generation when the event is generated in at least one application provided in the vehicle.

In one embodiment disclosed herein, the controller may control the display module to output a second notification icon on the second region when the event meets a predetermined condition.

In one embodiment disclosed herein, the first notification icon may disappear from the first region when the event meets the predetermined condition.

In one embodiment disclosed herein, the at least one application may include a forward collision warning, a blind spot detection, a lane departure warning, a pedestrian detection, a curve speed warning and a turn-by-turn navigation.

In one embodiment disclosed herein, a warning image notifying an orientation of an object corresponding to the event may be output on an edge of the second region when the first notification icon is output on the first region, and an output position of the warning image may differ according to the position of the object.

In one embodiment disclosed herein, the controller may select at least one of the graphic objects according to the driving information and move the selected at least one graphic object from the first region to the second region. The selected at least one graphic object may gradually increase in size as moving to the second region.

In one embodiment disclosed herein, the controller may output a first figure image guiding a movement to a second road on the second region when the vehicle should move from a first road to the second road during a movement to a destination and a remaining distance up to the second road corresponds to a reference distance. The controller may output a second figure image on the first figure image in a manner of gradually obscuring the first figure image, as moving close to the second road.

In one embodiment disclosed herein, one end of the first figure image may point at a position of the second road, and the first figure image may be transformed such that the one end thereof points at the position of the second road as the vehicle moves.

In one embodiment disclosed herein, the first figure image may disappear from the second region or the at least graphic object may be output on the first figure image when the at least one graphic object is output on the second region.

Also, the present invention can extend to a vehicle having the vehicle control device having at least one of the aforementioned characteristics.

According to the autonomous driving vehicle and a control method thereof disclosed herein, the following effects can be obtained.

According to the present invention, a display region formed on a windshield may be divided into a first region and a second region. The first region can always output information thereon and the second region cannot output any information according to situations. Also, the vehicle control device disclosed herein can output information on the second region limitedly in a surely necessary situation. This can prevent distractions of a driver's attention and minimize interference with driving due to information output on the windshield.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
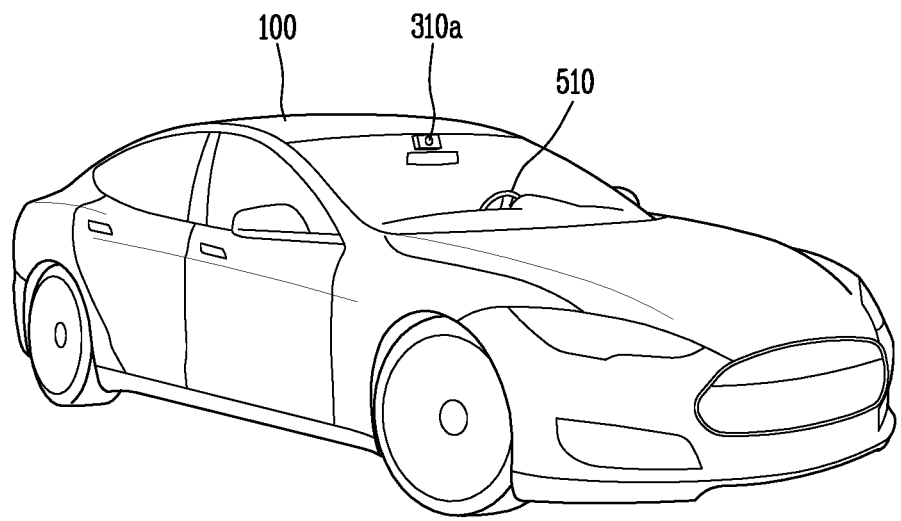
FIG. 1 is a view illustrating appearance of a vehicle in accordance with an embodiment of the present invention.
Figure 1:
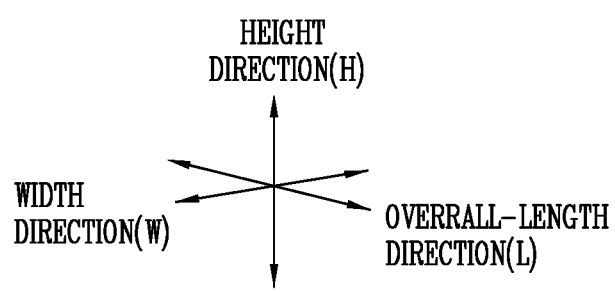

FIG. 1 is a view illustrating appearance of a vehicle in accordance with an embodiment of the present invention.

Figure 2:
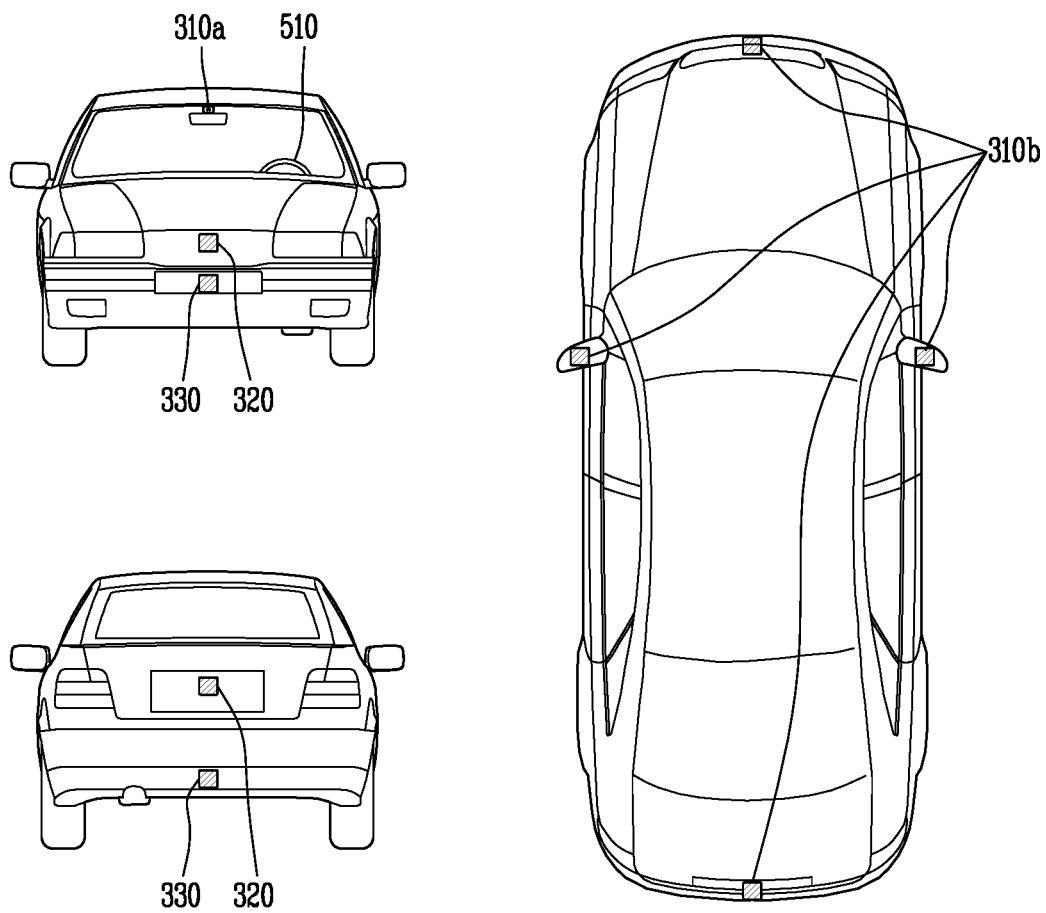
FIG. 2 is an outer view of the vehicle according to the embodiment of the present invention, viewed at various angels.

FIG. 2 is an outer view of the vehicle according to the embodiment of the present invention, viewed at various angels.

Figure 3:
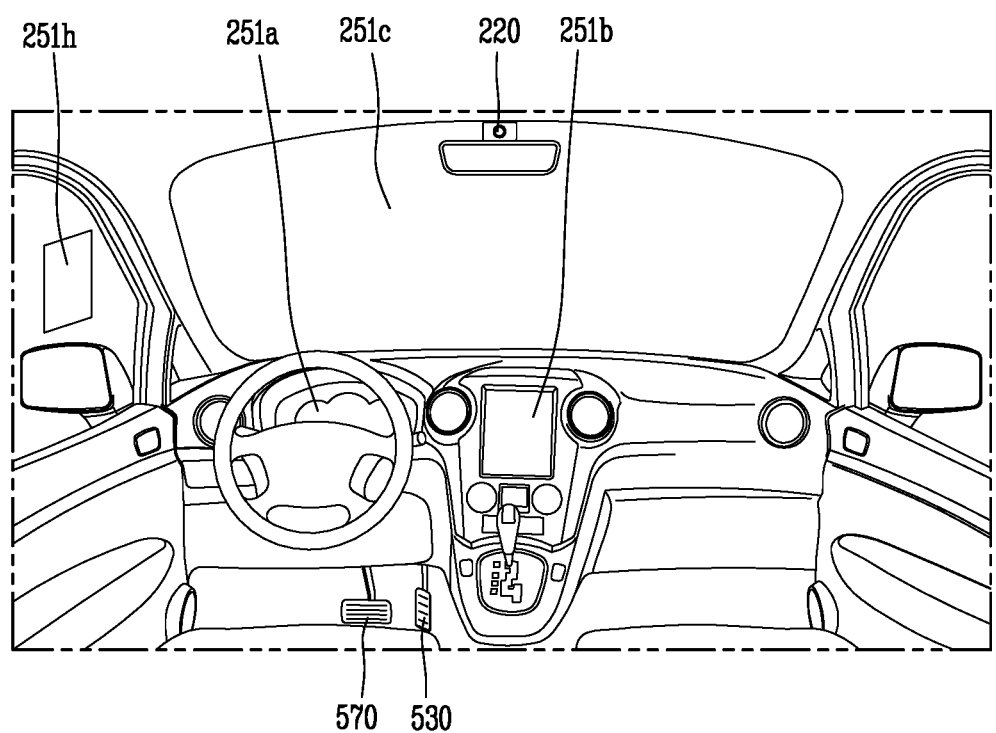
FIGS. 3 and 4 are views illustrating an inside of the vehicle in accordance with the embodiment of the present invention.
Figure 4:
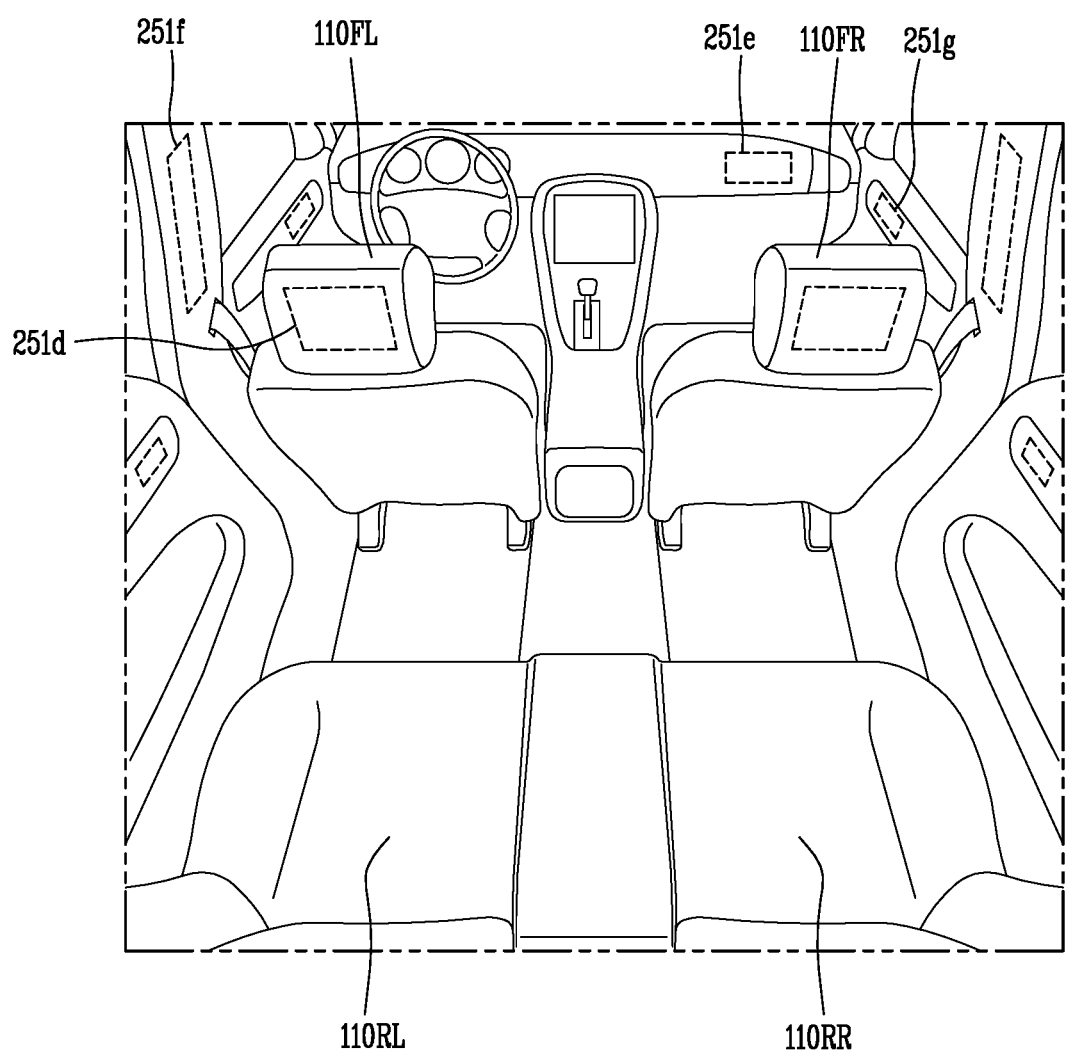

FIGS. 3 and 4 are views illustrating an inside of the vehicle in accordance with the embodiment of the present invention.

Figure 5:
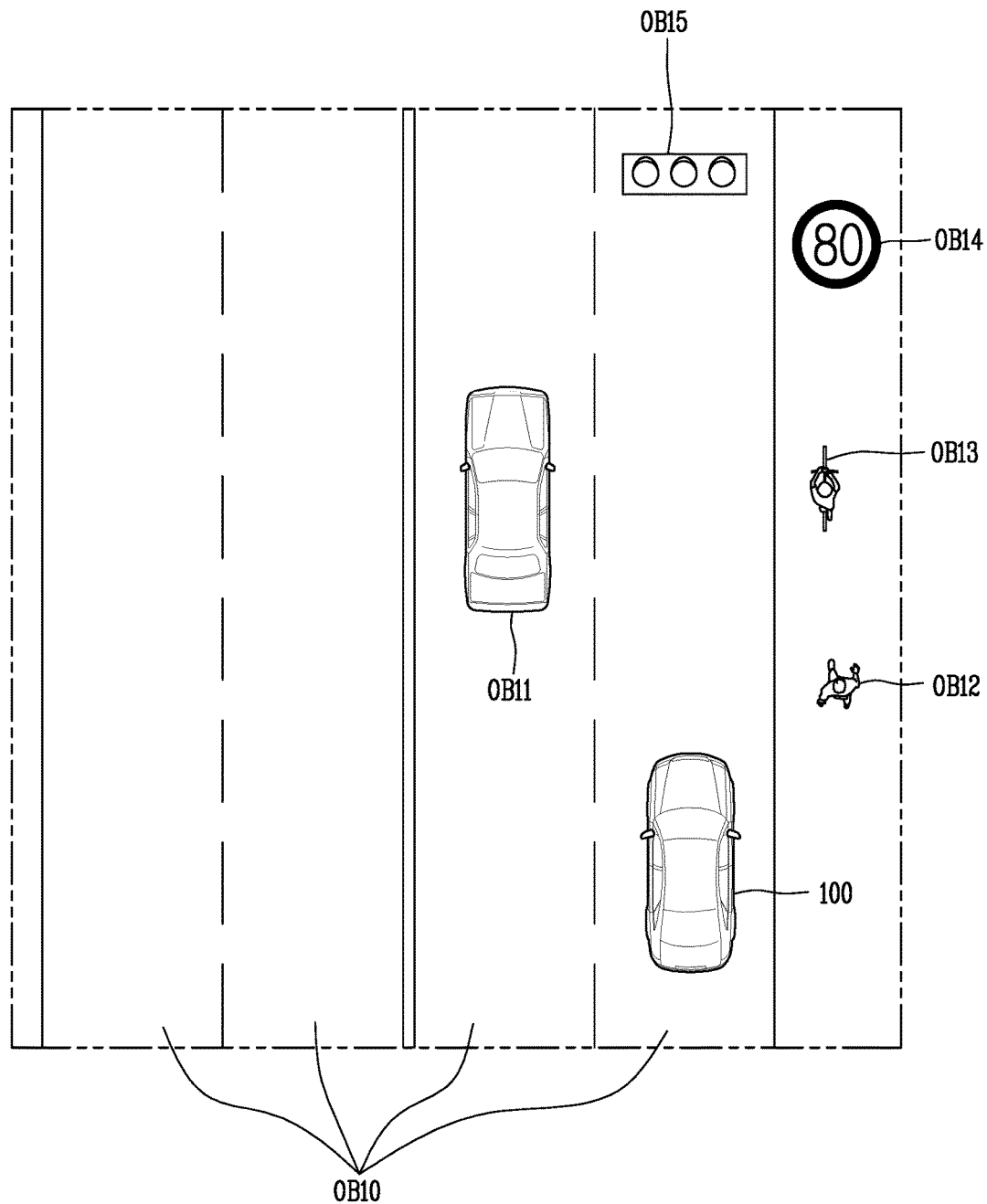
FIGS. 5 and 6 are reference views illustrating objects in accordance with an embodiment of the present invention.
Figure 6:
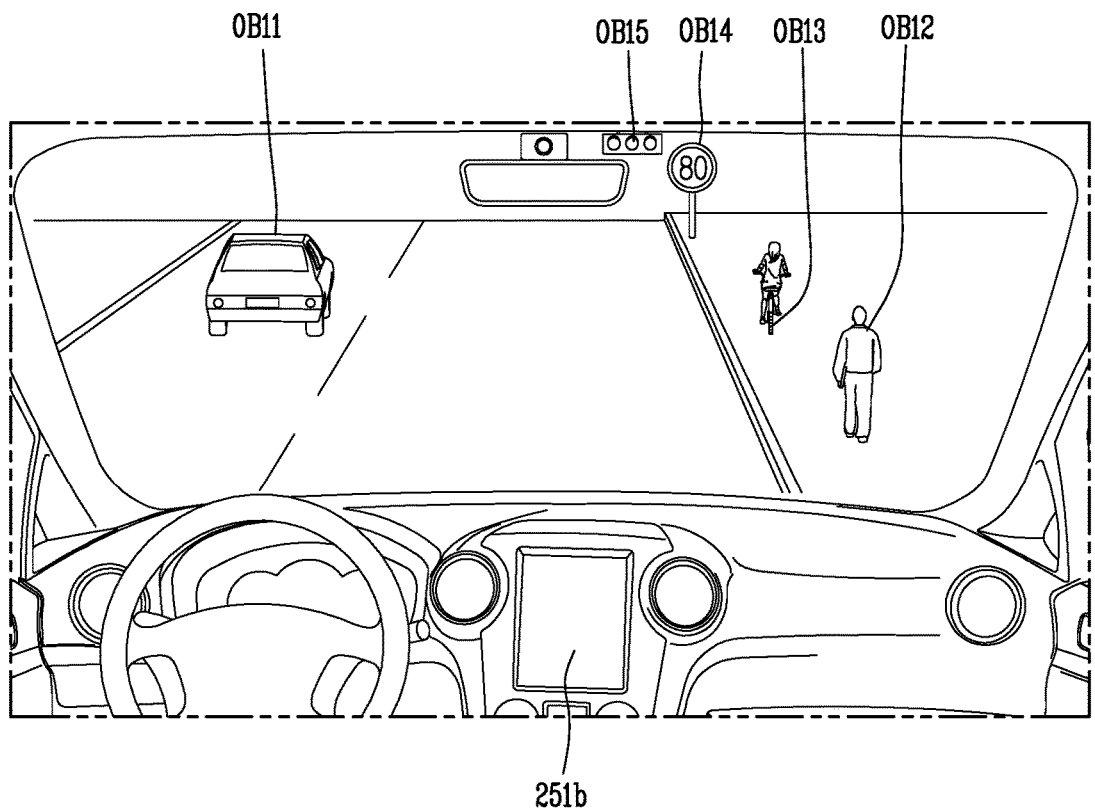

FIGS. 5 and 6 are reference views explaining objects in accordance with an embodiment of the present invention.

Figure 7:
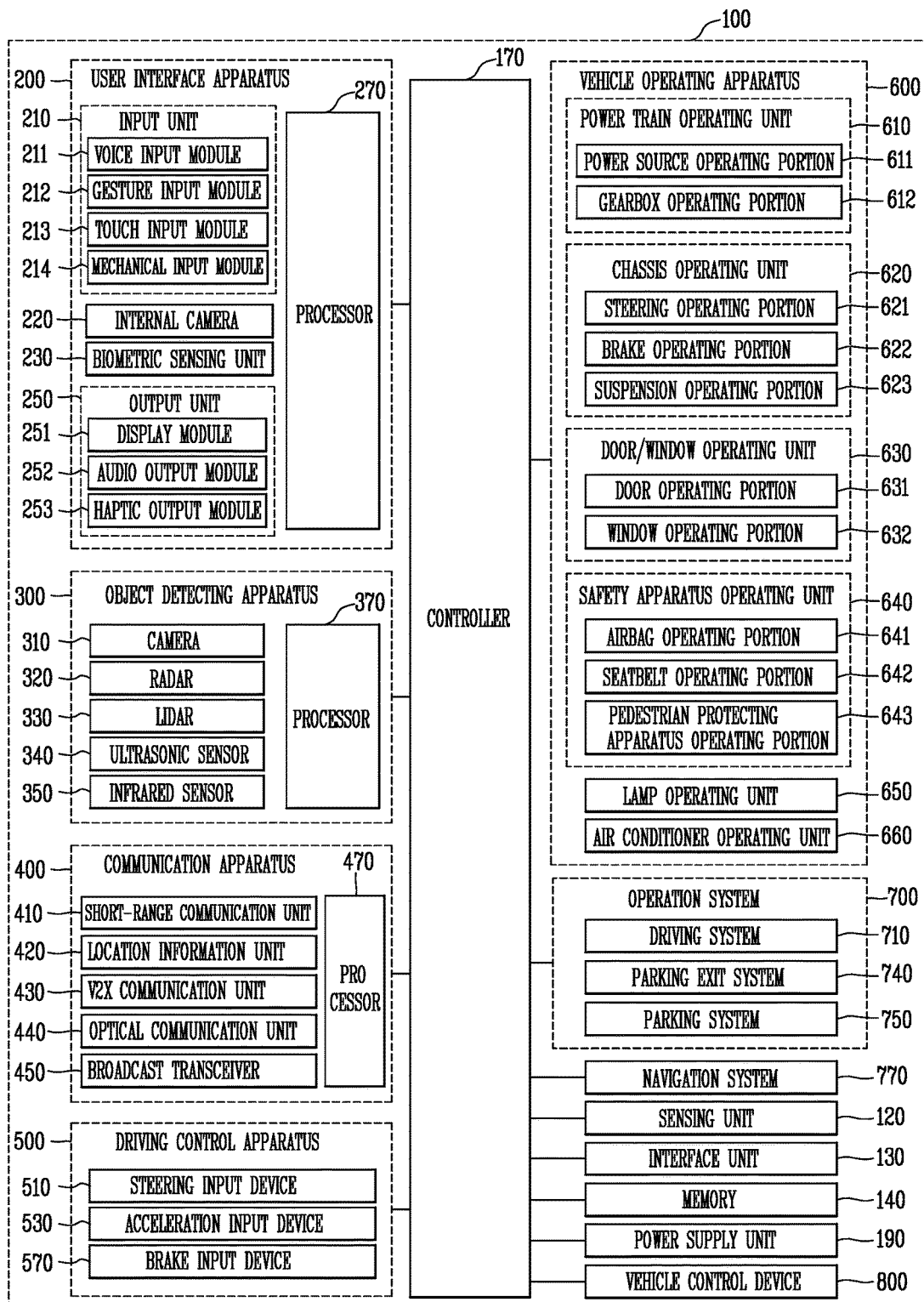
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

Here, autonomous driving is defined as controlling at least one of acceleration, deceleration and a driving direction based on a preset algorithm. In other words, even without a user input applied to a driving control apparatus, the driving control apparatus is automatically manipulated.

The vehicle 100 may be switched into an autonomous mode or a manual mode based on a user input.

For example, the vehicle 100 may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a windshield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication apparatus 400 may be referred to as 'wireless communication unit.'

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, a vehicle 100 according to the present invention may include a vehicle control device 800.

The vehicle control device 800 may control at least one of the components illustrated in FIG. 7. From this perspective, the vehicle control device 800 may be the controller 170.

With no limit to this, the vehicle control device 800 may be a separate component, independent of the controller 170. When the vehicle control device 800 is implemented as a component independent of the controller 170, the vehicle control device 800 may be one of electronic components equipped in the vehicle 100.

Hereinafter, for the sake of explanation, the vehicle control device 800 will be described as a separate component, independent of the controller 170. In this specification, functions (operations) and control methods illustrated in relation to the vehicle control device 800 may also be performed by the controller 170 of the vehicle. That is, every content described in relation to the vehicle control device 800 may also be applied equally/similarly to the controller 170.

Hereinafter, the vehicle control device 800 disclosed in this specification may include some of the components illustrated in FIG. 7 and various components provided in the vehicle. In this specification, for the sake of explanation, separate names and reference numerals will be given to those components illustrated in FIG. 7 and the various components provided in the vehicle.

Hereinafter, components included in the vehicle control device 800 in accordance with one embodiment of the present invention will be described in more detail, with reference to the accompanying drawings.

Figure 8:
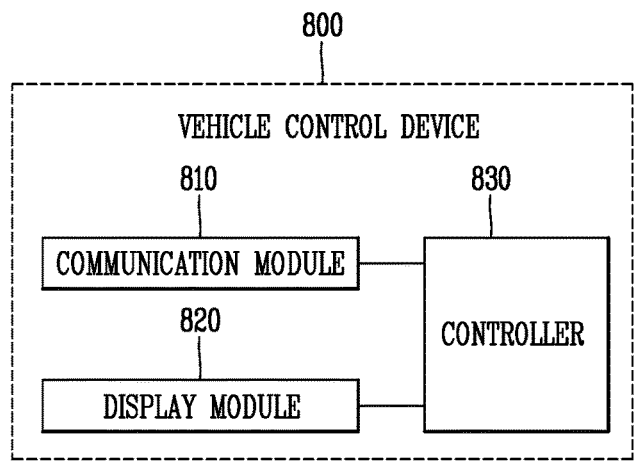
FIG. 8 is a conceptual view illustrating a vehicle control device in accordance with one embodiment of the present invention.

FIG. 8 is a conceptual view illustrating a vehicle control device in accordance with one embodiment of the present invention.

The vehicle control device 800 according to the present invention may include a communication module 810, a display module 820, a controller 830, and the like.

The communication module 810 may perform communication with various components illustrated in FIG. 7. For example, the communication module 810 may receive various information provided through a controller and network (CAN). As another example, the communication module 810 may perform communications with every communication-allowable device, such as a mobile terminal, a server and another vehicle. This may be referred to as vehicle to everything (V2X) communication. The V2X communication may generally be defined as a technology of exchanging or sharing information, such as traffic condition and the like, through communication with road infrastructures and other vehicles while the vehicle moves.

The display module 820 may output various information according to the control of the controller 830 provided in the vehicle control device 800. The display module 820 may be implemented as a head up display (HUD) or a transparent display. When implemented as the transparent display, the display module 830 may be arranged on a windshield or window of the vehicle. Hereinafter, for the sake of explanation, the present invention will be described under assumption that the display module 820 is implemented as the HUD, but the display module 820 may be implemented in various manners of creating augmented reality (AR).

The controller 830 is configured to control the communication module 810 and the display module 820. In detail, the controller 830 controls the display module 820 to change (vary) output information on the basis of information received through the communication module 810.

The controller 830 may receive information related to driving of the vehicle from various sensors provided in the vehicle through the communication module 810. In addition to the sensors, the controller 830 may receive the information related to the driving of the vehicle from every apparatus provided in the vehicle 100. Hereinafter, every information received in the vehicle control device is referred to as 'vehicle driving information.'

The vehicle driving information includes vehicle information and surrounding information regarding the vehicle.

The vehicle information refers to information related to the vehicle itself. The vehicle information, for example, may include a driving speed of the vehicle, a driving direction, an acceleration, an angular speed, a location (GPS), a weight, the number of persons seated in the vehicle, braking force of the vehicle, maximum braking force of the vehicle, air pressure of each wheel, centrifugal force applied to the vehicle, a driving mode of the vehicle (an autonomous driving mode or a manual driving mode), a parking mode of the vehicle (an autonomous parking mode, an automatic parking mode and a manual parking mode), a presence or absence of a user in the vehicle, information related to the user, and the like.

The surrounding information regarding the vehicle refers to information related to other objects located within a predetermined range from the vehicle, and information related to an outside of the vehicle. For example, the surrounding information regarding the vehicle may include a state (frictional force) of a road surface on which the vehicle is currently traveling, the weather, a distance from a front (or rear) vehicle, a relative speed of the front (or rear) vehicle, curvature of a curve when a currently-driving lane is a curve, ambient brightness of the vehicle, information related to an object existing within a reference area (predetermined area) based on the vehicle, an entrance/exit of an object into/from the predetermined area, a presence or absence of a user near the vehicle, information related to the user (e.g., whether or not the user is an authenticated user) and the like.

Also, the surrounding information regarding the vehicle (or surrounding environment information) may include ambient brightness, temperature, a solar position, an adjacent object (person, another vehicle, road sign, etc.), a type of a currently-driving road surface, a landmark, line information, lane information, and information required for autonomous driving/autonomous parking/automatic parking/manual parking modes.

Also, the surrounding information regarding the vehicle may further include a distance up to the vehicle 100 from an object existing adjacent to the vehicle, a type of the object, a parking-available space for the vehicle, an object (e.g., a parking line, a string, another vehicle, a wall, etc.) for identifying a parking space, and the like.

Hereinafter, various operations of the controller 830 based on the vehicle driving information will be described with reference to the accompanying drawings.

Figure 9:
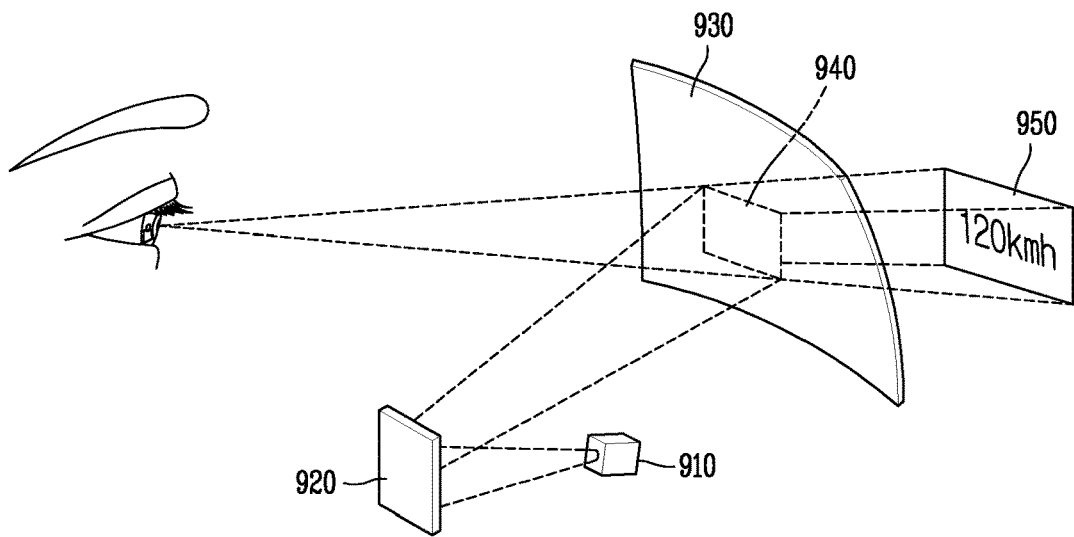
FIG. 9 is a conceptual view illustrating a display module of a vehicle control device in accordance with one embodiment of the present invention.

FIG. 9 is a conceptual view illustrating a display module of a vehicle control device in accordance with one embodiment of the present invention.

An HUD is an apparatus that is designed to show driving information on front glass of the vehicle. The HUD has initially been introduced to ensure a pilot's forward field of view, but is currently applied even to a vehicle for reducing accidents.

The HUD prevents driver's distractions by outputting various driving-related information, such as image information for navigating a path of travel, text information for guiding speed and the like, on the windshield glass or ahead of the windshield glass in an augmented reality (AR) form, under the control of the vehicle control device.

Hereinafter, an image output through the HUD is referred to as 'HUD image.'

The output of the HUD image is implemented in a manner of outputting the HUD image on a position that the driver can view by reflecting an image projected through the display module, such as a projector, by use of a mirror.

As illustrated in FIG. 9, the HUD image is output from the display module 910. The output image is then reflected by a mirror 920 so as to be directed toward the windshield 930. In this instance, the HUD image may be projected on the windshield 930 or a separate screen (not illustrated) which is located between the mirror 920 and the windshield 930.

An entire region on which the display module 910 can output the HUD image on the windshield 930 is defined as a display region 940. For example, when a yellow background image is output from the display module 910, a region on which the yellow background image is output on the windshield 930 corresponds to the display region 940. The display region 940 may vary according to a setting of the vehicle control device or positions of the driver's eyes.

Meanwhile, a virtual region 950 for implementing AR may be defined by the display region 940 and the driver's gaze. The virtual region 950 refers to a region, on which objects existing in the real world and a virtual image output on the display region 940 overlap each other, namely, a region recognized by the driver as a coexisting region of the real world and a virtual world. If it is assumed that the display region 940 is fixed, the virtual region 950 may vary as the positions of the driver's eyes change because the real world located in a direction that the driver gazes varies according to the positions of the driver's eyes.

Since the HUD image is output on the transparent windshield in the reflecting manner, the driver can view a currently-driving (moving) road while checking the HUD image. In other words, augmented reality (AR) can be implemented by the HUD image.

The AR refers to a technology of bringing and outputting virtual related information with respect to an actual object. Using the AR, the HUD image is output to overlap an actual background which is viewed through the windshield within the vehicle. Accordingly, the driver can check information, such as an address of an actual building, a real estate assessment, facilities provided in the building, customer reviews on the facilities and the like, through the HUD image output using the actual building as a background.

Figure 10:
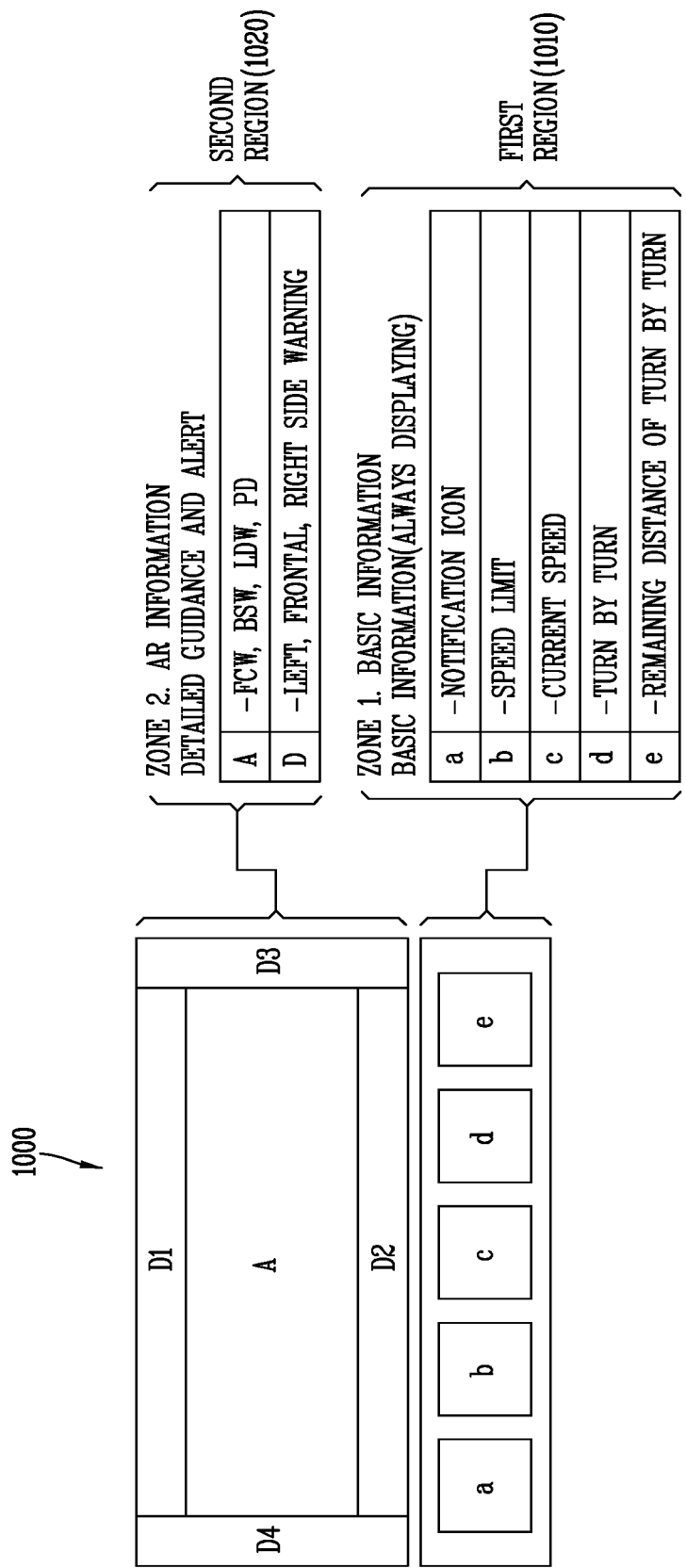
FIG. 10 is a conceptual view illustrating a display region formed by the vehicle control device according to the present invention.

FIG. 10 is a conceptual view illustrating a display region formed by the vehicle control device according to the present invention.

A display region 1000 is formed on the windshield and thereby may distract the driver's attention. To prevent this, the display region 1000 is formed adjacent to a lower end of the windshield based on a driver seat. In detail, if a virtual reference point is set based on a viewing direction of the driver when the driver seats in the driver seat, a center point of the display region 1000 is located below the reference point.

The display region 1000 is generally formed in a rectangular shape. When a height of the display region 1000 increases, a virtual image is highly likely to be output in front of the driver's field of view so as to obscure an object existing in the real world. When the object is obscured by the virtual image, an accident may be caused by the object.

To solve this problem, the vehicle control device 800 disclosed herein divides the display region 1000 into a first region 1010 and a second region 1020. The first region 1010 occupies a lower portion of the display region 1000, and the second region 1020 occupies an upper portion of the display region 1000. That is, the second region 1020 is located above the first region 1010.

The first region 1010 outputs thereon graphic objects for navigating a path of travel of the vehicle. The first region 1010 is a region on which information related to the driving of the vehicle is basically output, and corresponds to a region on which at least one graphic object is always displayed.

For example, when an event is generated in an application, a notification icon notifying the event generation may be output on the first region 1010. Also, a speed limit of a currently-driving road, a current speed of the vehicle, a turn-by-turn navigation for navigating a path up to a destination, and a remaining distance of turn-by-turn may be output as graphic objects on the first region 1010. When a plurality of events are generated in a plurality of applications, a plurality of notification icons may also be output on the first region 1010.

The notification icon corresponds to one example of the graphic object.

As illustrated in FIG. 10, an output position of each graphic object may be fixed.

On the other hand, the output positions may flexibly change according to priorities. In this instance, the controller 830 may calculate priorities of graphic objects, respectively, according to a preset algorithm, and preferentially output a graphic object with a high priority on a center of a screen.

For example, when a first event is generated in a first application and a priority of the first event is lower than a priority of a speed limit of a currently-driving road, the speed limit may be output on the center of the first region 1010 and a notification icon corresponding to the first event may be output on an edge of the first region 1010. As another example, when a second event is generated in a second application and a priority of the second event is higher than the priority of the speed limit, a notification icon corresponding to the second event may be output on the center of the first region 1010 and the speed limit may be output on the edge of the first region 1010.

When the output positions of the graphic objects flexibly change, an animation effect that each graphic object moves may be generated. For example, when a second graphic object is newly output while a first graphic object is output, the first graphic object may be moved from a first position to a second position and the second graphic object may be output on the first position.

Meanwhile, an application is a conception including a widget or a home launcher, and refers to every type of program executable in the vehicle. Therefore, the application may be a program of executing a function, such as an advanced driver assistance system (ADAS), a navigation, the weather, a radio, a web browser, an audio reproduction, a video reproduction, a message transmission and reception, a schedule management or an update of an application.

The event generation, for example, may include a warning generation set in the ADAS, a control generation set in the ADAS, a presence of a missed call, a presence of an application to be updated, a reception of a message, start-on, start-off, an autonomous driving ON/OFF state, pressing of an LCD awake key, an alarm, an incoming call, a missed notification and the like.

As another example, when specific information is received through a wireless communication unit of a terminal, it indicates that an event has been generated in an application associated with the specific information, and the controller detects this. Or, when a brake works, irrespective of pressing of a brake pedal, in response to a detection of an object having collision probability (i.e., collision risk) by more than a predetermined level, it indicates that an event has been generated in an autonomous emergency braking (AEB) application. Or, when a lane departure is detected, it indicates that an event has been generated in a lane keeping assistance system (LKAS) application.

The application may include at least one of forward collision warning (FCW), blind spot detection (BSD), lane departure warning (LDW), pedestrian detection (PD), curve speed warning (CSW), and turn-by-turn navigation (TBT).

Meanwhile, the second region 1020 which is a region for implementing the AR refers to a region in which detailed information and a warning requiring for the driver's attention is output. The first region 1010 may always output information thereon whereas the second region 1020 may not output any information according to situations.

The second region 1020, compared with the first region 1010, may be defined as a region for outputting relatively important information. The controller 830 may calculate importance of information to output, and output the information on the second region 1020, other than the first region 1010, when the calculated importance of the information is higher than a reference. The second region 1020 may be wider and closer to the driver's eyes than the first region 1010. Thus, the driver pays more attention to the second region 1020 when specific information is output on the second region 1020 rather than the first region 1010.

An edge of the second region 1020 may be used as a region for notifying an orientation of a specific object. On the basis of the driver, an upper end D1 of the second region 1020 may indicate (show) a front side of the vehicle, and a lower end D2 of the second region may indicate a rear side of the vehicle. Continuously, a right end D3 of the second region indicates a right side and a left end D4 of the second region indicates a left side. Through the edge of the second region, user interfaces by which the driver can intuitively recognize a position of a specific object can be provided.

Hereinafter, a control method of differently processing various information using the display region 1000 according to situations will be described with reference to FIG. 11.

Figure 11:
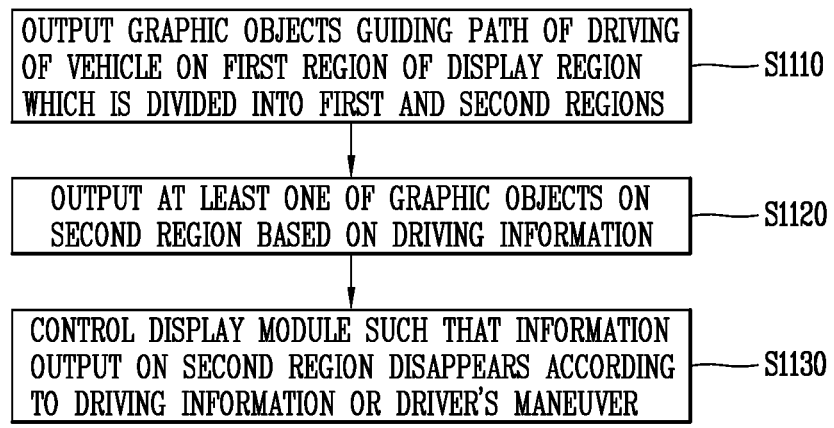
FIG. 11 is a flowchart illustrating a control method by a vehicle control device according to the present invention.

FIG. 11 is a flowchart illustrating a control method by the vehicle control device according to the present invention.

First, the controller 830 outputs graphic objects for navigating a path of travel of the vehicle on the first region of the display region which is divided into the first region and the second region (S1110). That is, the controller 830 controls the display module 820 to output the graphic objects on the first region.

The controller 830 may receive vehicle driving information from various electronic components equipped in the vehicle, and select graphic objects to output on the first region based on the received vehicle driving information. At least one graphic object selected based on the vehicle driving information is output on the first region. Each of the notification icon, the speed limit, the current speed or the like which have been described in FIG. 10 may be output on the first region in the form of the graphic object.

For example, when an event is generated in at least one application provided in the vehicle, the controller 830 may control the display module 820 to output a first notification icon notifying the event generation on the first region.

As another example, when collision probability (i.e., probability of colliding) with an object located outside the vehicle meets a first reference, the controller 830 may control the display module 820 to output a first graphic object for guiding the collision probability on the first region.

Next, the controller 830 may output at least one of the graphic objects on the second region according to the driving information (S1120).

The first region corresponds to a region outputting basic information, and the second region corresponds to a region outputting information with importance higher than a reference. In other words, the controller 830 outputs information with importance lower than the reference on the first region and information with importance higher than the reference on the second region. Accordingly, substantially the same information may be output on the first region or the second region according to the importance.

As one example, when an event is generated in an application, the controller 830 may output a first notification icon corresponding to the event on the first region. When the event meets a predetermined condition, the controller 830 controls the display module 820 to output a second notification icon on the second region.

The first notification icon and the second notification icon may simultaneously be output on the display region. Or, when the second notification icon is output while the first notification icon is output (or when the event meets the predetermined condition), the first notification icon may disappear from the first region.

The first notification icon and the second notification icon have the same shape, but the second notification icon may be greater than the first notification icon in size. Accordingly, when the second notification icon is output on the second region, the driver may intuitively recognize that the importance of the event has become higher. The first notification icon and the second notification icon may alternatively have different shapes from each other.

As another example, when collision probability with an object located outside the vehicle meets a first reference, the controller 830 may output a first graphic object for guiding (notifying, warning) the collision probability on the first region. Afterwards, when the collision probability meets a second reference different from the first reference, the controller 830 controls the display module 820 to output a second graphic object for guiding (notifying, warning) the collision probability on the second region. When the collision probability meets the second reference, the first graphic object may disappear from the first region.

Meanwhile, the controller 830 may select at least one of the graphic objects output on the first region according to the driving information, and move the selected at least one graphic object from the first region to the second region. For example, an animation effect that the first graphic object moves from the first region to the second region may be generated. In this instance, the second graphic object may be defined as the first graphic object which has moved to the second region. When the first graphic object moves from the first region to the second region, a size of the first graphic object may gradually increase, a color may change or a flickering frequency may change during the movement.

Next, the controller 830 may control the display module 820 such that the information output on the second region disappears according to the driving information or a driver's maneuver (S1130).

When the information is continuously output on the second region, it may distract the driver's attention, which may result in interference with the driving. Therefore, the controller 830 may limitedly output information on the second region, if only necessary.

For example, when the generated event is terminated, the second notification icon output on the second region may disappear. As another example, when the generated event which has met the predetermined condition does not meet the predetermined condition any more, the second notification icon may disappear from the second region and the disappeared first notification icon may appear back on the first region.

While the second graphic object is output on the second region due to an object having collision probability, the collision probability may be lowered from the second reference down to a first reference. In this instance, the second graphic object may disappear from the second region and the first graphic object may reappear on the first region. When the collision probability completely disappears, the first graphic object and the second graphic object may disappear from the display region.

Also, when the driver inputs a maneuver for making the generated event disappear, the second notification icon may disappear from the second region. For example, while a notification message notifying a lane departure is output on the second region in response to a detection of the lane departure, when a driving direction changes into a direction without departing from the lane, the notification message may disappear from the second region. As another example, while a warning message for a forward collision warning is output on the second region, when the user changes a lane or hits a brake, the warning message may disappear from the second region.

Hereinafter, various operations of the vehicle control device according to the aforementioned control method will be described with reference to the accompanying drawings.

Figure 12:
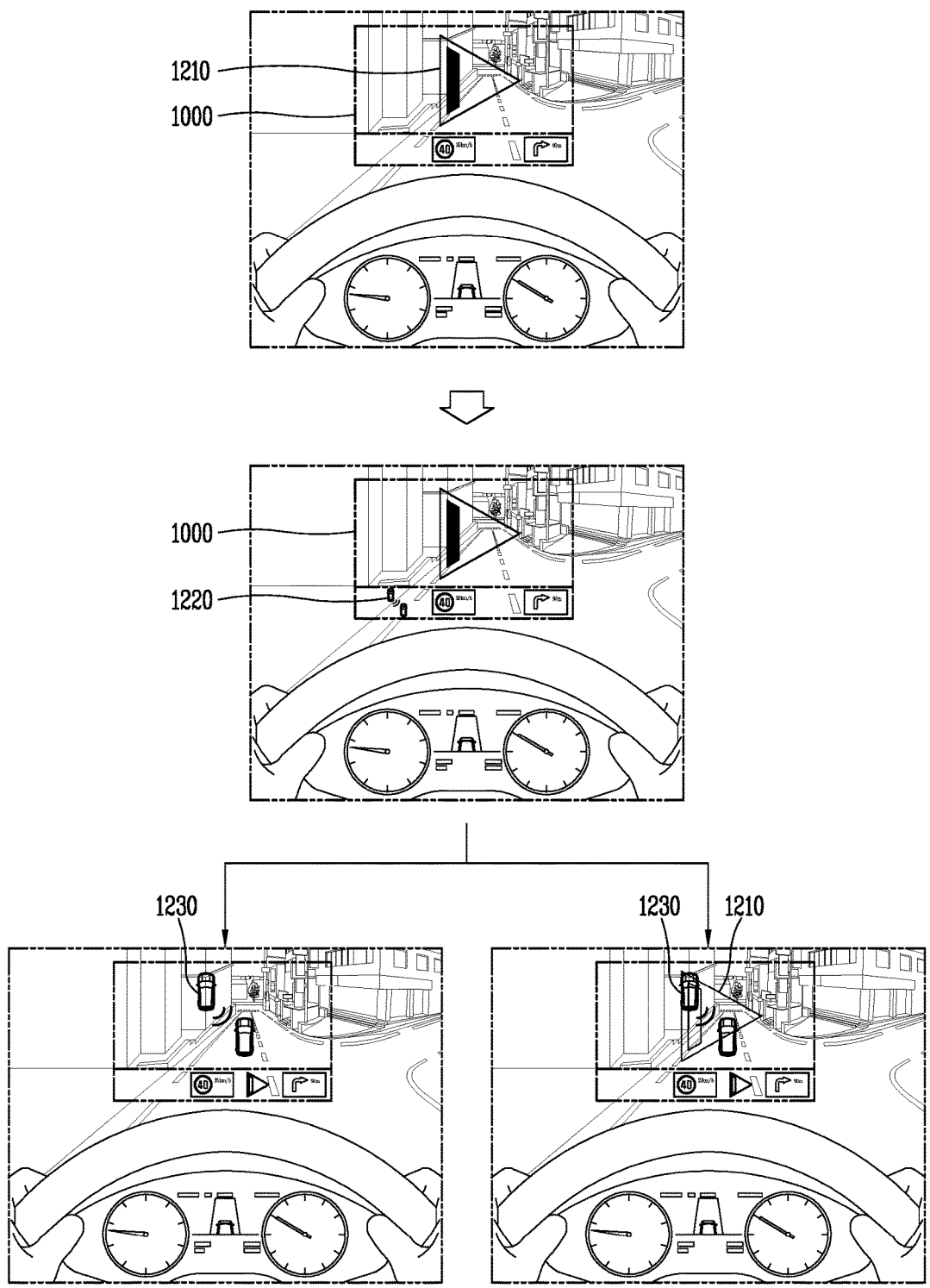
FIG. 12 is an exemplary view illustrating an operation of the vehicle control device according to the control method of FIG. 11.

FIG. 12 is an exemplary view illustrating an operation of the vehicle control device according to the control method of FIG. 11.

The controller 830 of the vehicle control device disclosed herein may decide a driving (travel) path heading to a destination based on a current position of the vehicle. Also, the controller 830 may specify a first road on which the vehicle is currently moving, and search for a second road to change later. When the vehicle has to move from the first road to the second road, the controller 830 may calculate a remaining distance up to the second road. Here, the first road and the second road refer to roads with different names.

When a remaining distance up to the second road corresponds to a reference distance, the controller 830 may output a first figure image 1210 on the second region to guide the movement to the second road. This may be considered as a case where an event is generated in a turn-by-turn navigation application and a figure image corresponding to the event may be output on the second region. Accordingly, the user can intuitively fast recognize a road to move.

Meanwhile, when an event is generated in an application provided in the vehicle, a first notification icon corresponding to the event may be output on the first region. The first notification icon may change into a different image according to a type of application or a type of event generated. Here, the different image refers to an image with a different shape, length, color or the like.

For example, as illustrated in FIG. 12, when collision probability with an object located at the rear of the vehicle meets a first reference, it may indicate that an event has been generated in a blind spot detecting application, and a first notification icon 1220 notifying a detection of a blind spot may be output on the first region.

Afterwards, when the collision probability with the object increases to meet a second reference higher than the first reference, a second notification icon 1230 may be output on the second region. The second notification icon 1230 may differ in at least one of size, flickering frequency and color according to the collision probability. The driver may indirectly recognize a distance from the object based on the at least one.

The second notification icon 1230 may be output on the first figure image 1210, or the first figure image 1210 may disappear from the second region only when the second notification icon 1230 is output. When the second notification icon 1230 and the first figure image 1210 are simultaneously output, transparency of the first figure image 1210 may change.

The first figure image 1210 is controlled to disappear in order for the driver to pay more attention to a warning situation. The first figure image 1210 is controlled to be continuously output in order for the driver to keep gaze a direction to go forward.

Due to the difference in purpose, the controller 830 may decide whether or not to output the corresponding notification icon according to importance of an event generated. For example, when the first figure image 1210 is as important as having to be provided to the user (or when the importance of the first figure image 1210 is higher than importance of the second notification icon 1230), the first figure image 1210 and the second notification icon 1230 may simultaneously be output. On the contrary, when the importance of the first figure image 1210 is lower than a reference, the first figure image 1210 may disappear and only the second notification icon 1230 may be output on the second region. The importance is calculated based on vehicle driving information generated from various apparatuses provided in the vehicle.

To prevent redundancy of information, the first notification icon 1220 may disappear from the first region when the second notification icon 1230 is output on the second region.

Figure 13A:
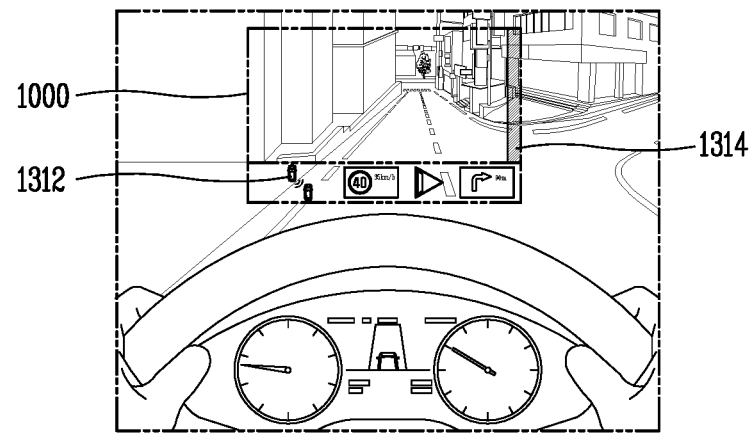
FIGS. 13A and 13B are exemplary views illustrating operations of the vehicle control device in response to a detection of a blind spot.
Figure 13A:
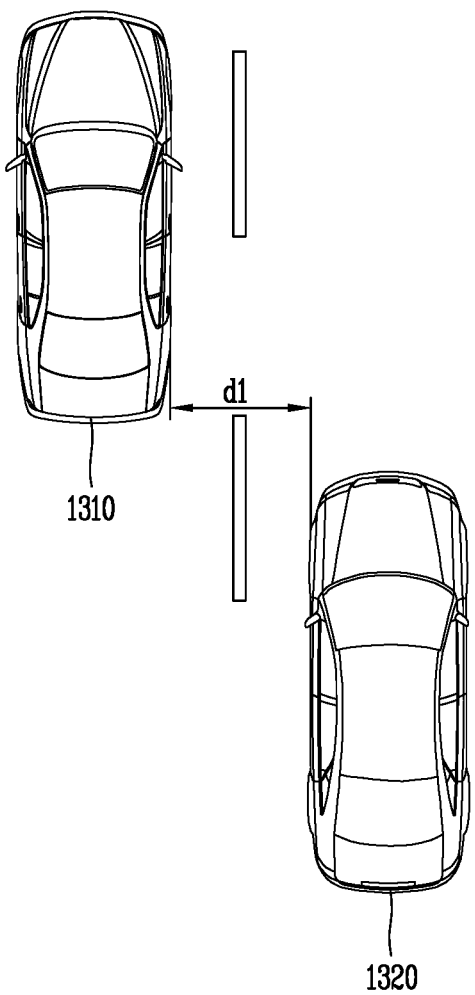
Figure 13B:
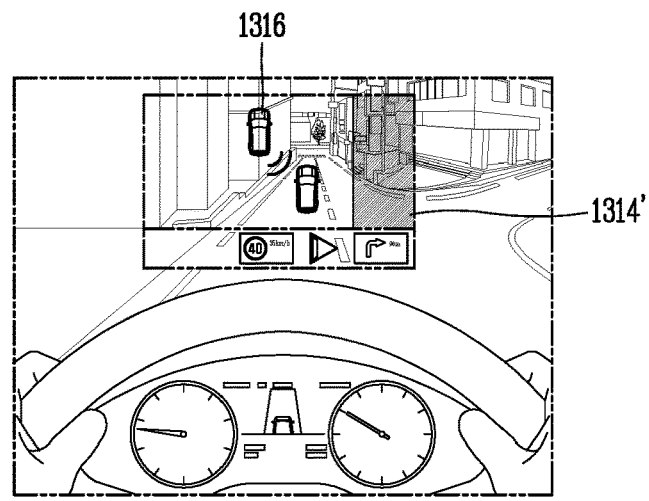
Figure 13B:
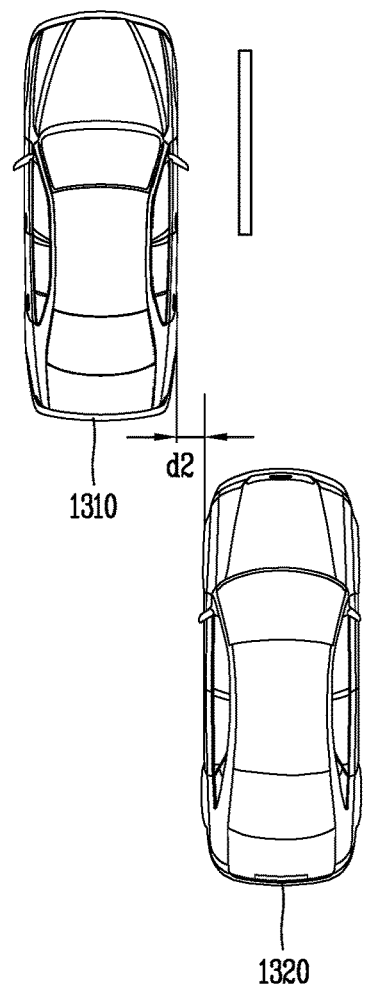

FIGS. 13A and 13B are exemplary views illustrating operations of the vehicle control device in response to a detection of a blind spot.

As illustrated in FIG. 13A, the controller 830 may output a first graphic object (or a first notification icon 1312) on the first region 1010 in response to an event generation. In detail, when a second vehicle 1320 is detected within a predetermined distance from at least one of a rear side and one side of a first vehicle 1310, an event of alerting a blind spot is generated in a blind spot detecting application of the first vehicle 1310. Responsive to the event generation, the vehicle control device 800 outputs a first notification icon 1312 warning the blind spot on the first region 1010 of the display region 1000.

In addition, the controller 830 controls the display module 820 to output a warning image 1314 notifying an orientation of an object corresponding to the event on an edge of the second region 1020.

Here, the object corresponding to the event may differ according to a generated event. For example, as illustrated in FIG. 13A, when an event notifying collision probability with an object located at the blind spot is generated, the object may be the second vehicle 1320 having the collision probability. On the other hand, when an event of warning a lane departure is generated, the object may be a lane to which the vehicle moves. When an event of detecting a pedestrian is generated, the pedestrian corresponds to the object.

The warning image is a bar-like image formed long along the second region 1020 and may be output adjacent to at least one of upper, lower, right and left ends of the second region 1020.

An output position of the warning image differs according to a position of the object. For example, when the object is located at the front of the vehicle, the warning image is output adjacent to the upper end of the edge of the second region 1020. When the object is located at the rear of the vehicle, the warning image is output adjacent to the lower end of the edge of the second region 1020. As another example, when the object is located at a right rear side, the warning image is output adjacent to the lower end and the rear end of the edge of the second region 1020. In this instance, the warning image may have a bent shape based on one corner of the second region 1020.

Meanwhile, at least one of a color, a flickering frequency and a size of the warning image may gradually change according to the collision probability with the object. The warning image may also be output in a different manner according to whether or not the second notification icon corresponding to the event is output on the second region 1020.

For example, as illustrated in FIG. 13A, when a distance d1 from the second vehicle 1320 meets a first reference, the first notification icon 1312 is output on the first region 1010. And, the warning image 1314 notifying the position of the second vehicle 1320 is output adjacent to the right end of the second region 1020.

On the other hand, as illustrated in FIG. 13B, when a distance d2 from the second vehicle 1320 meets a second reference, a second notification icon 1316 is output on the second region 1020 and a size of a warning image 1314' increases. Accordingly, the driver can more pay attention to an object located at the blind spot. Also, the driver can intuitively recognize where the second vehicle 1320 is located based on the output position of the warning image.

FIGS. 14A to 14D are exemplary views illustrating operations of the vehicle control device according to a front collision warning.

Figure 14A:
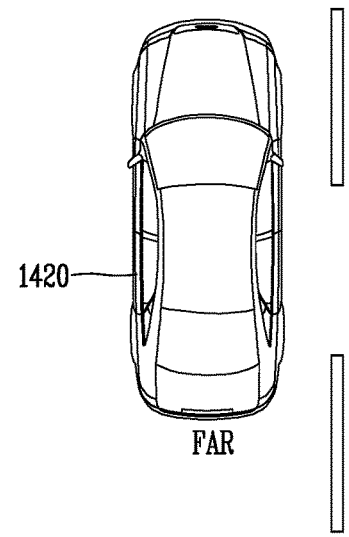
FIGS. 14A to 14D are exemplary views illustrating operations of the vehicle control device according to a front collision warning.
Figure 14A:
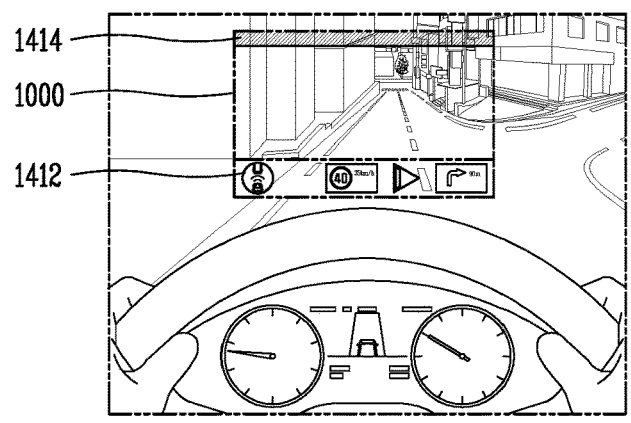
Figure 14A:
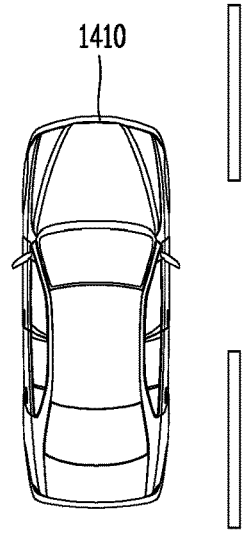

As illustrated in FIG. 14A, when a forward collision warning event is generated by a first vehicle 1410, a first notification icon 1412 notifying a forward collision warning may be output on the first region 1010 of the windshield of the first vehicle 1410. In addition, a warning image 1414 guiding an orientation of another vehicle 1420 corresponding to a target of the forward collision (i.e., an object with which the first vehicle 1410 is likely to collide at the front) may be output adjacent to an upper end of the second region 1020 to correspond to a position of the another vehicle 1420.

Figure 14B:
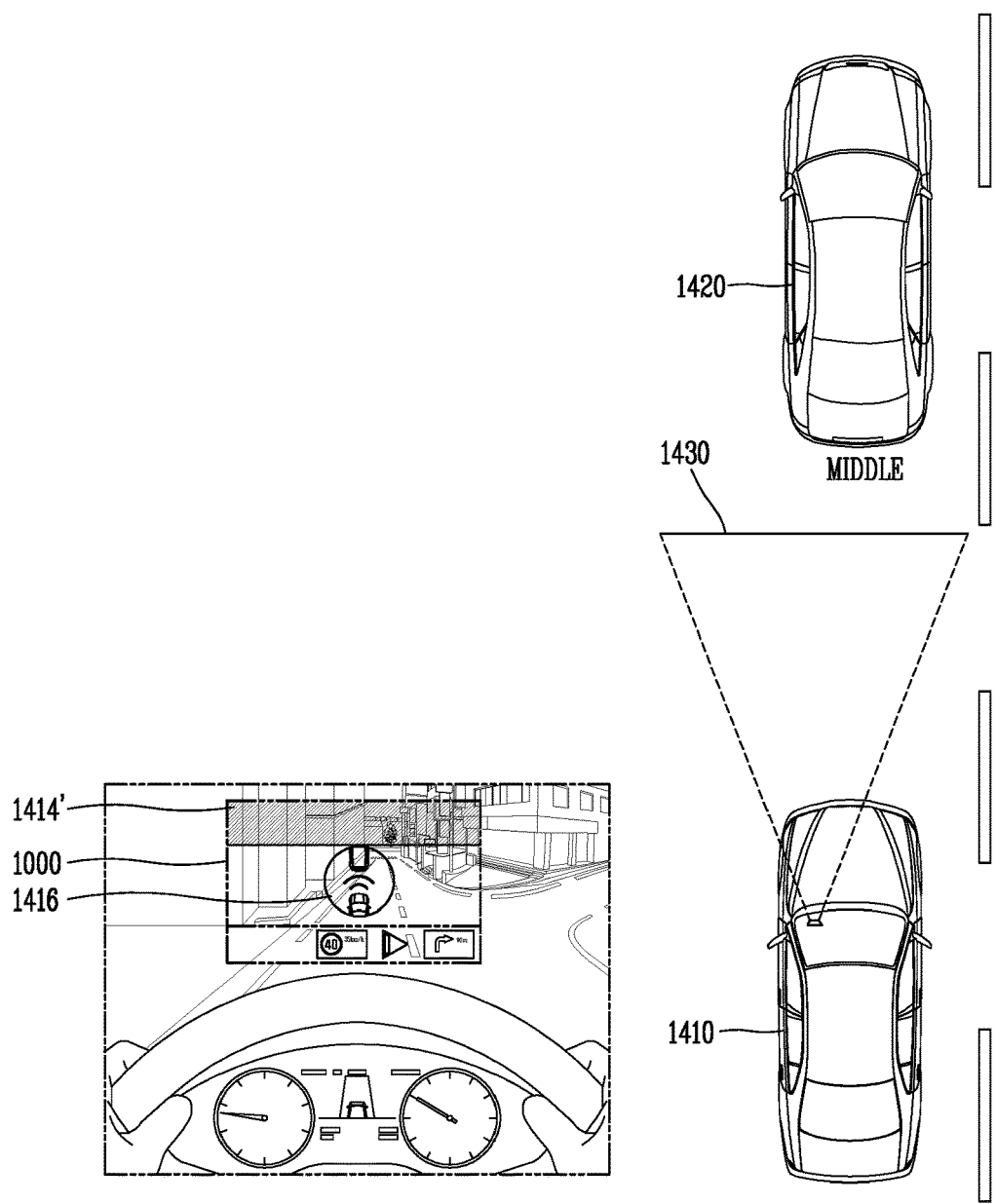

As illustrated in FIG. 14B, when the forward collision warning event meets a predetermined condition, the second notification icon 1416 may be output on the second region, and a size, a color and a flickering frequency of a warning image 1414' may differ.

Meanwhile, the controller 830 may define a virtual region 1430 based on a display region and the driver's gaze. The virtual region refers to a region on which a virtual image generated by the display module 820 based on the driver's gaze overlaps the real world. The virtual region 1430 differs according to positions of the driver's eyes and the display region 1000.

Figure 14C:
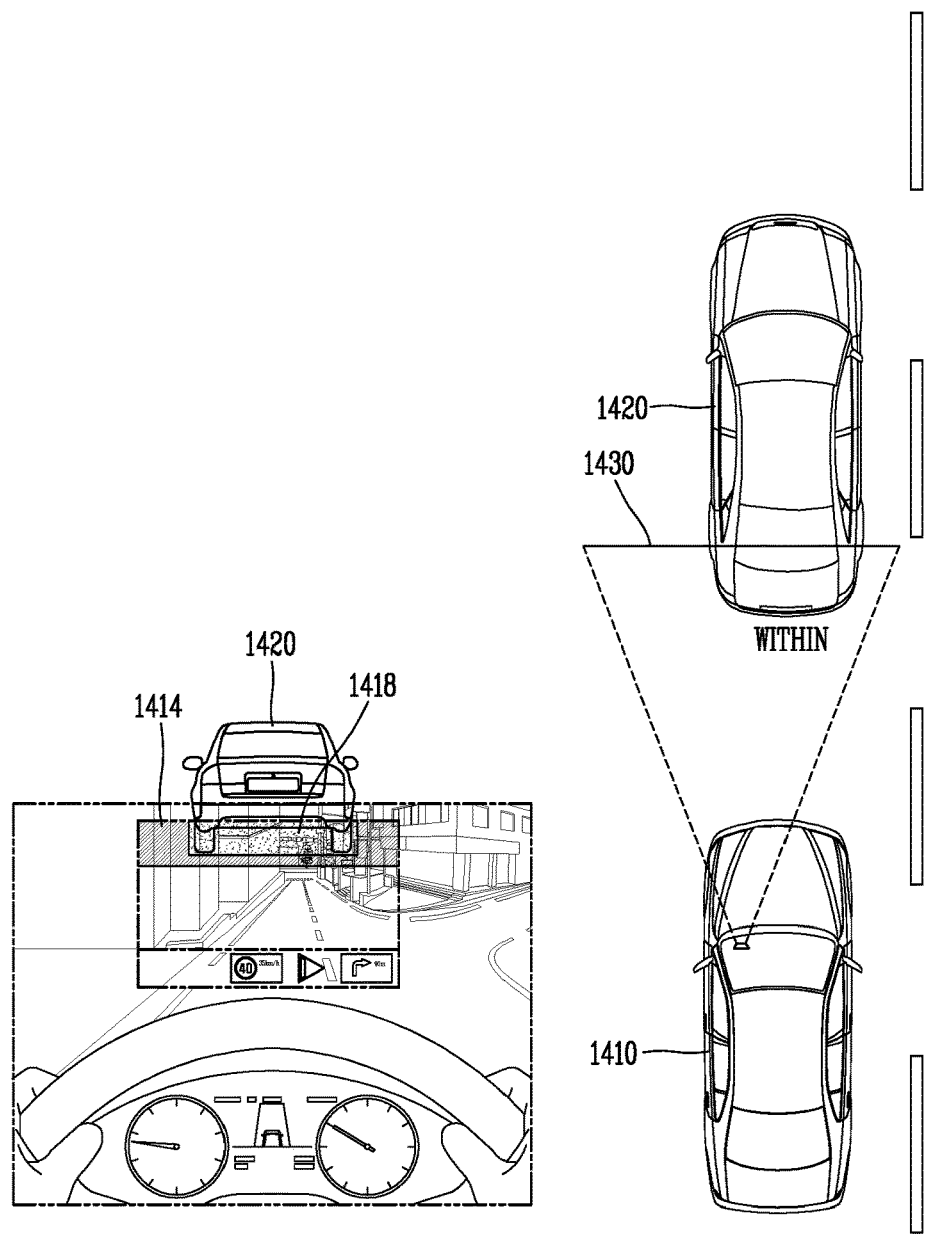

As illustrated in FIG. 14C, when an object having collision probability, namely, the second vehicle 1420 is located in the virtual region 1430, the controller 830 may control the display module 820 to output an additional warning image 1418 on a portion of the display region which overlaps the object.

The warning image and the additional warning image may be images having at least one color, and be transparent such that the real world can be viewed by the driver through the warning image and the additional warning image.

The additional warning image 1418 may be output above the first warning image 1414, and at least part of the additional warning image 1418 may overlap the first warning image 1414.

When the additional warning image 1418 is output while the second notification icon 1416 is output on the second region 1020, the second notification icon 1416 may disappear from the second region 1020. Since the object having the collision probability is recognized by the driver by virtue of the additional warning image 1418, the second notification icon 1416 which is redundant information may disappear from the display region 1000.

Figure 14D:
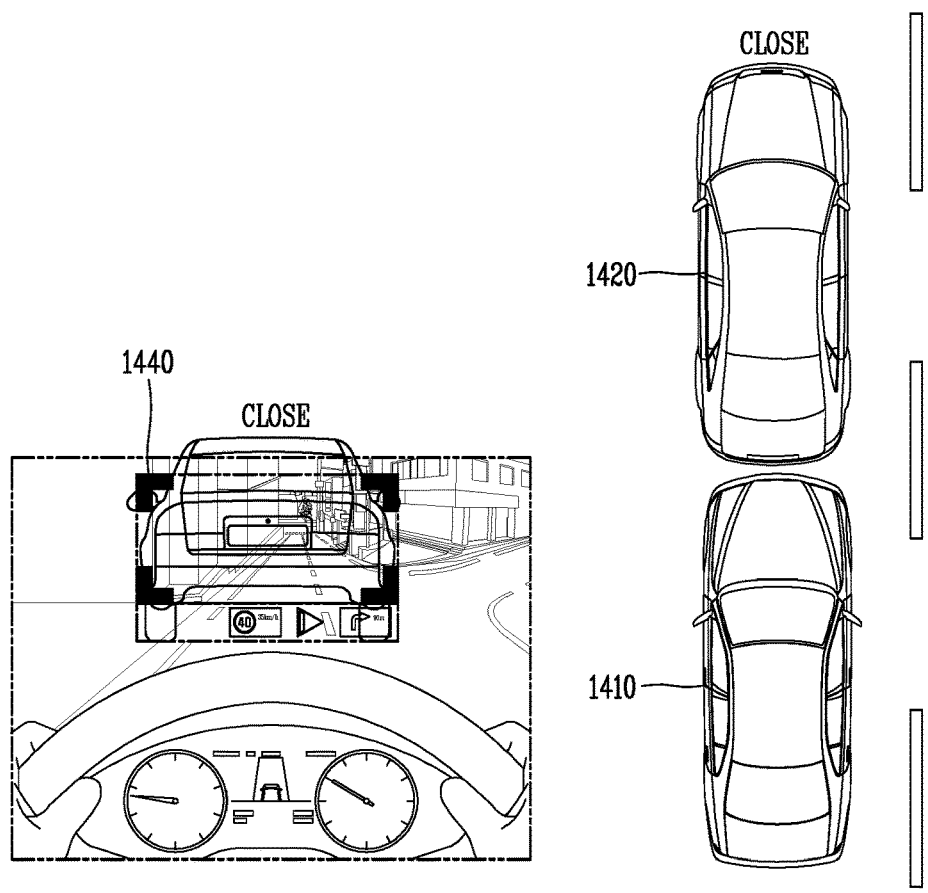

Meanwhile, as illustrated in FIG. 14D, when at least part of the object having the collision probability is included in the virtual region by more than a predetermined rate, every information output on the second region 1020 may disappear. In addition, images 1440 in a shape of a cramp may be output on corners of the second region 1020.

When the collision probability disappears or is lowered down to the first reference, the controller 830 controls the display module 820 such that the first notification icon 1412, the second notification icon 1416, the warning image 1414 and the additional warning image 1418 disappear from the display region 1000.

Figure 15:
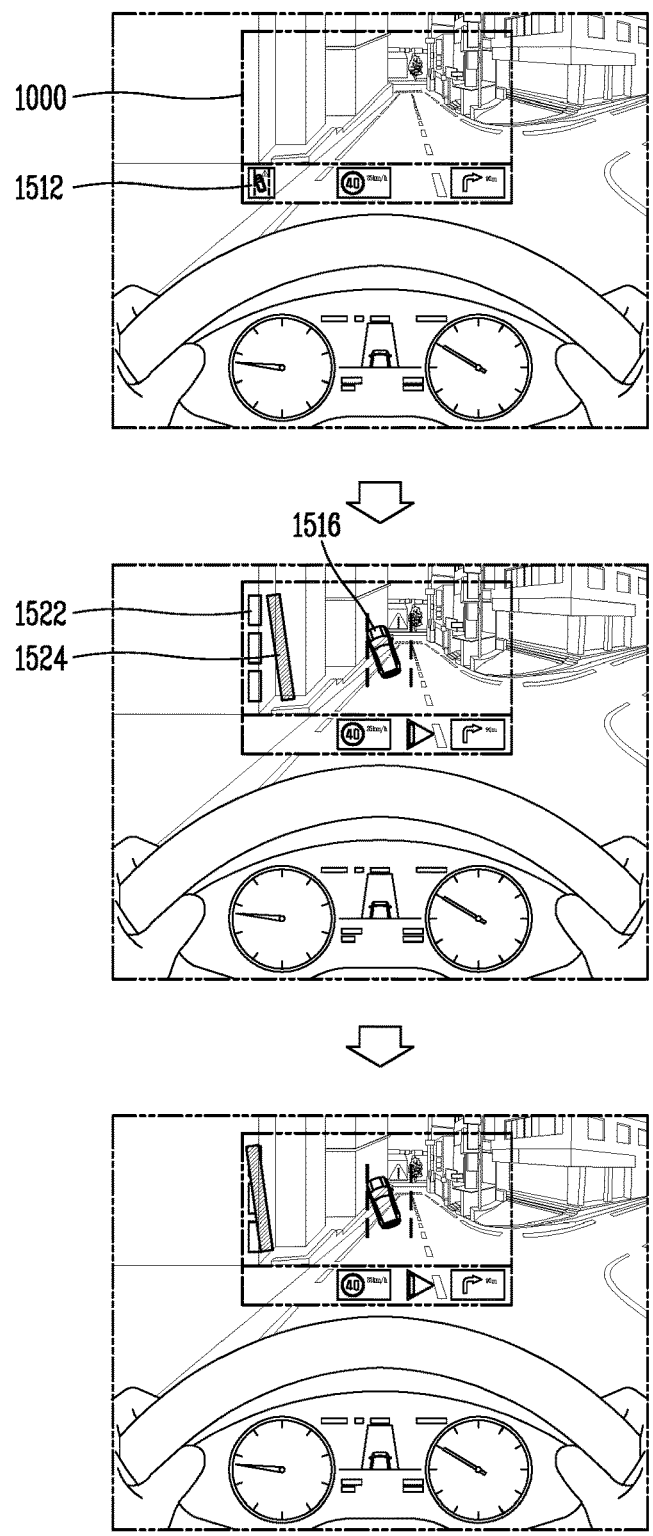
FIG. 15 is an exemplary view illustrating an operation of the vehicle control device according to a lane departure warning.
Figure 16:
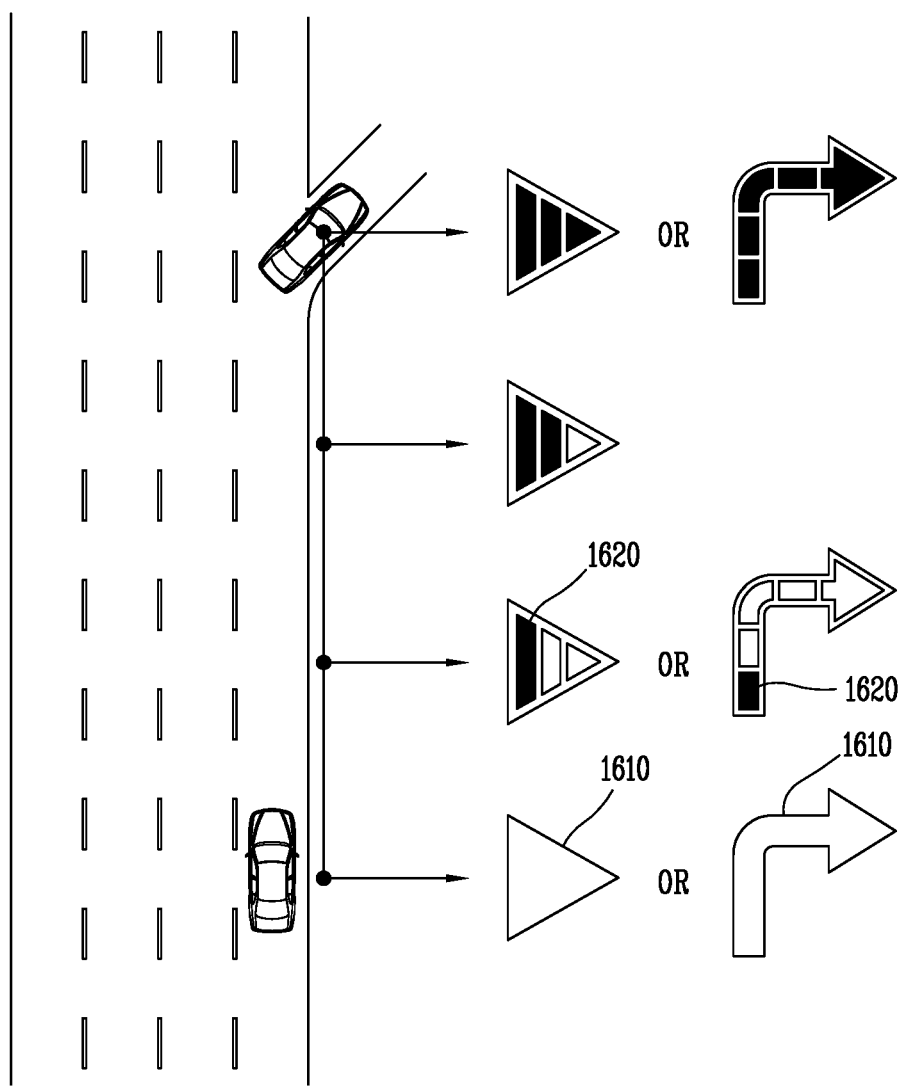
FIGS. 16 to 18B are conceptual views illustrating a turn-by-turn navigation provided by the vehicle control device in accordance with one embodiment of the present invention.

FIG. 15 is an exemplary view illustrating an operation of the vehicle control device according to a lane departure warning.

Even when an event of a lane departure warning is generated, a first notification icon 1512 may be output on the first region 1010. When the lane departure warning event meets a predetermined condition, a second notification icon 1516, instead of the first notification icon 1512, may be output on the second region 1020.

The predetermined condition in the lane departure warning event may be whether or not a distance between the lane and a part of the vehicle is shorter than a reference distance. For example, the first notification icon 1512 may be output on the first region 1010 when the distance between the lane and the part of the vehicle meets a first reference, and the second notification icon 1516 may be output on the second region 1020 when the distance meets a second reference.

Meanwhile, in the lane departure warning event, the lane may be selected as an object to be warned. For example, when it is determined that the vehicle is to depart from a left lane, the left lane corresponds to the object. On the other hand, when it is determined that the vehicle is to depart from a right lane, the right lane corresponds to the object.

When the object is the left lane, an image 1524 may be output adjacent to a left end of the second region 1020. On the other hand, when the object is the right lane, the warning image may be output adjacent to a right end of the second region 1020.

In addition, an object image 1522 indicating the object may be output on the second region 1020. The object image 1522 may become a different image according to a type of the object. For example, as illustrated in FIG. 15, when the object is the lane, the object image 1522 may be an image in a shape of a dotted line indicating the lane. Although not illustrated, when the object is a pedestrian or a bicycle, an image having a corresponding shape may be output as an object image on the second region 1020.

An output position of the warning image 1524 may vary according to a distance between the object and a part of the vehicle. In other words, the output position of the warning image 1524 and the output position of the object image 1522 reflect a relative distance between the object and the vehicle. For example, when a part of the vehicle has moved over a left lane, the warning image 1524 and the object image 1522 may be output in an overlapping manner. Accordingly, the user can recognize that the part of the vehicle has moved over the left lane.

The vehicle control device disclosed herein can effectively provide information to which the driver has to pay attention, by differently processing an output position of information, even though a screen size is limited due to a limitation on the display module itself.

Meanwhile, the vehicle control device disclosed herein can navigate a direction to drive (move) accurately and dynamically. Hereinafter, description will be given in detail of a control method in which the controller 830 provides a turn-by-turn navigation using the display module 820, with reference to the accompanying drawings.

FIGS. 16 to 18B are conceptual views illustrating a turn-by-turn navigation provided by a vehicle control device in accordance with one embodiment of the present invention.

During heading to a destination, when the vehicle has to move from a first road to a second road and a remaining distance up to the second road corresponds to a reference distance, the controller 830 may output a first figure image 1610 on the second region 1020 to guide an entrance to the second road.

Here, the reference distance refers to a necessary distance for the driver to get ready for entering the second road from the first road, and may vary according to a position of a currently-traveling lane, a driving speed, a presence or absence of an object having collision probability.

The first road and the second road refer to roads with different names. For example, the first road may be the 17th Street Northwest and the second road may be the K Street Northwest.

As moving close to the second road, the controller 830 may output a second figure image 1620 on the first figure image 1610 in a manner of gradually obscuring the first figure image 1610. The size of the second figure image 1620 gradually increases according to the remaining distance up to the second road.

The driver may recognize the reference distance and a direction to travel based on the first figure image 1610, and also recognize the remaining distance based on the second figure image 1620.

Figure 17A:
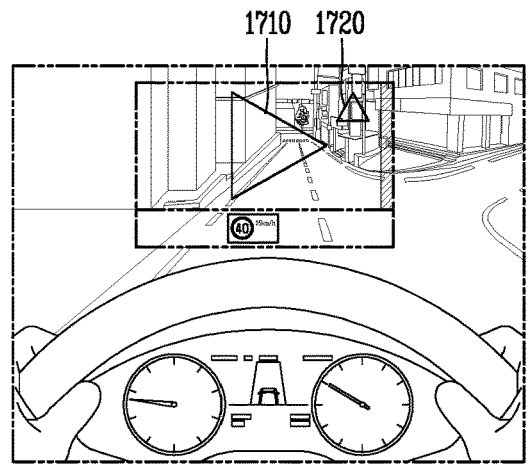

Meanwhile, as illustrated in FIG. 17A, when the vehicle has to move to a third road immediately after entering the second road from the first road, the first figure image 1710 corresponding to the second road and a third figure image 1720 corresponding to the third road may be simultaneously output on the second region 1020.

Output positions of the first figure image 1710 and the third figure image 1720 may be decided by an order of roads that the vehicle should move and orientations of the roads. Because the second road first appears, the first figure image 1710 is output on the center of the second region 1020. In addition, since the second road is located on the right of the first road, the third figure image 1720 is located on the right of the first figure image 1710. Unlike the positions illustrated in the drawing, when the second road is located on the left of the first road, the third figure image 1720 is located on the left of the first figure image 1710.

Referring to the figure images illustrated in FIG. 17A, the driver can intuitively recognize the need of a left turn after a right turn.

Figure 17B:
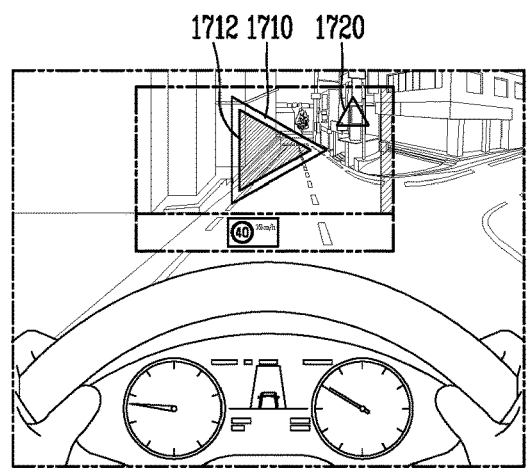
Figure 17C:
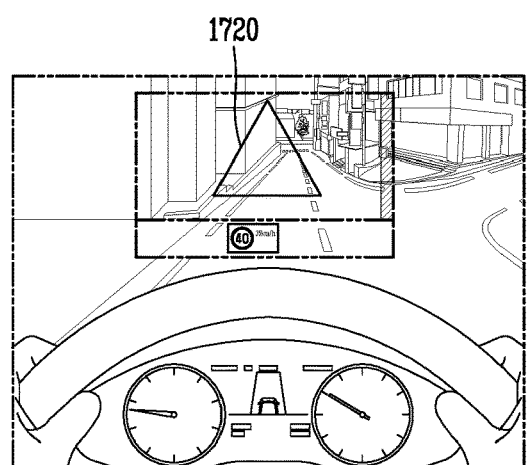

As the remaining distance up to the second road is reduced, as illustrated in FIG. 17B, the second figure image 1712 obscuring the first figure image 1710 is output and the size of the second figure image 1712 gradually increases. When the vehicle arrives at the second road, as illustrated in FIG. 17C, the first and second figure images 1710 and 1712 disappear from the second region 1020 and only the third figure image 1720 is output on the second region 1020. In this instance, the third figure image 1720 is moved to the center of the second region 1020.

Meanwhile, one end of the first figure image points at the position of the second road. The first figure image is transformed such that the one end of the first figure image points at the position of the second road.

Figure 18A:
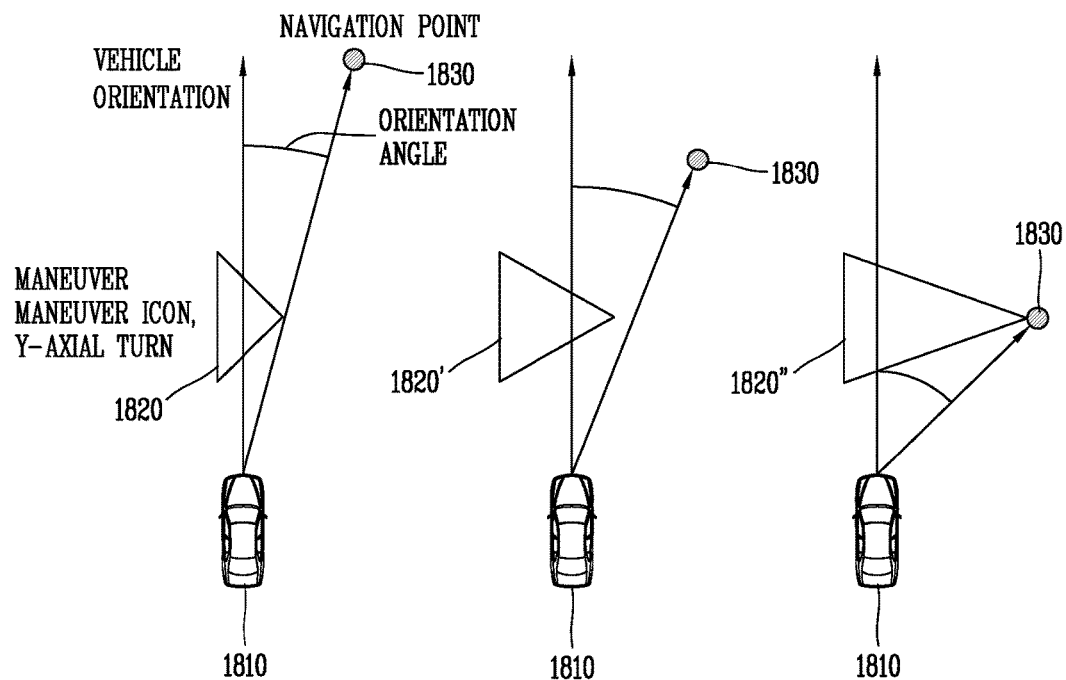

When the vehicle has to make a right turn in order to move from the first road to the second road, the first figure image guides (navigates) the right turn. For example, as illustrated in FIG. 18A, a triangle 1820 pointing at a right direction may be the first figure image. In this instance, a right end (vertex) of the triangle which guides a navigation point 1830 is transformed (1820→1820'→1820") according to the position of a vehicle 1810.

Figure 18B:
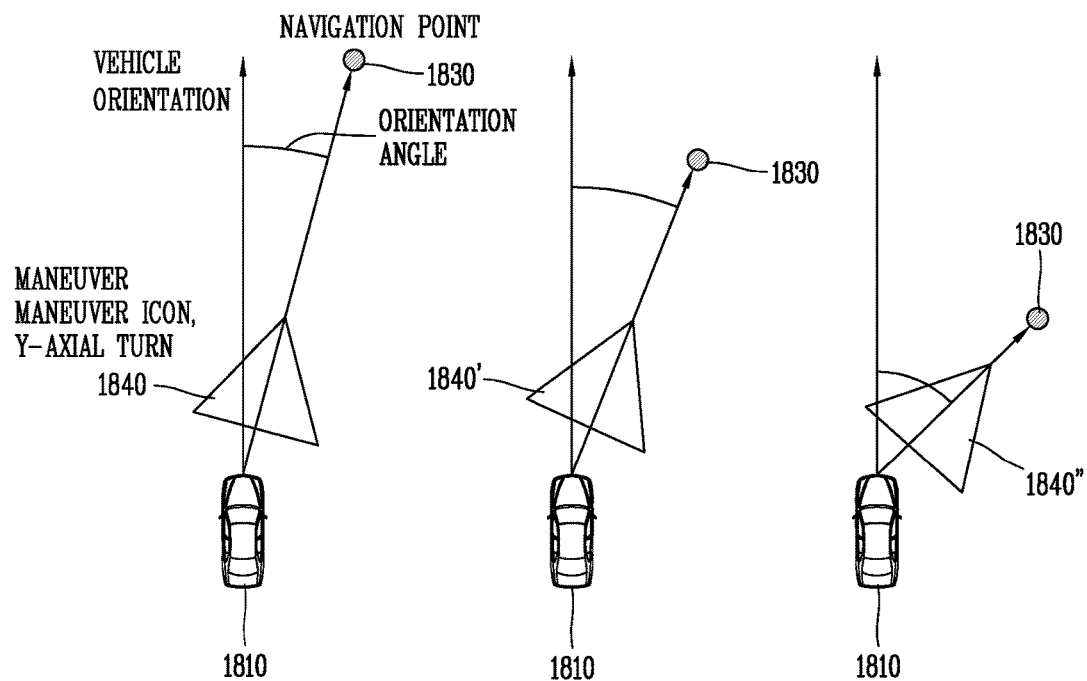

As another example, as illustrated in FIG. 18B, one end of a triangle may point at the navigation point itself, and the first figure image may also rotate (1822→1822'→1822"), in response to the movement of the vehicle.

As the graphic object output on the first region is output on the second region 1020, those figure images may disappear from the second region 1020 or the graphic object may be output on those figure images.

Meanwhile, the vehicle control device disclosed herein may control the display module 820 in different manners according to a driving mode of the vehicle. Here, the driving mode of the vehicle refers to an autonomous driving mode of changing an acceleration and a driving direction according to a preset algorithm, or a manual driving mode of changing an acceleration or a driving direction according to a driver's maneuver.

Figure 19:
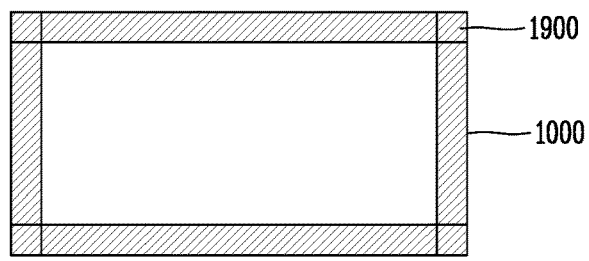
FIGS. 19 and 20 are exemplary views illustrating operations of the vehicle control device during autonomous driving.
Figure 19:
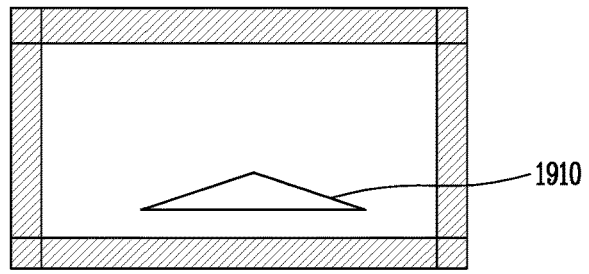
Figure 19:
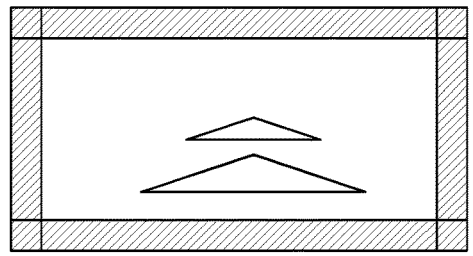
Figure 19:
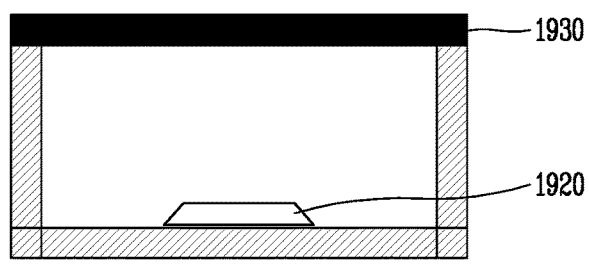
Figure 19:
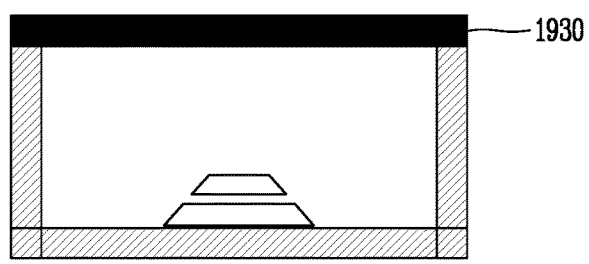
Figure 20:
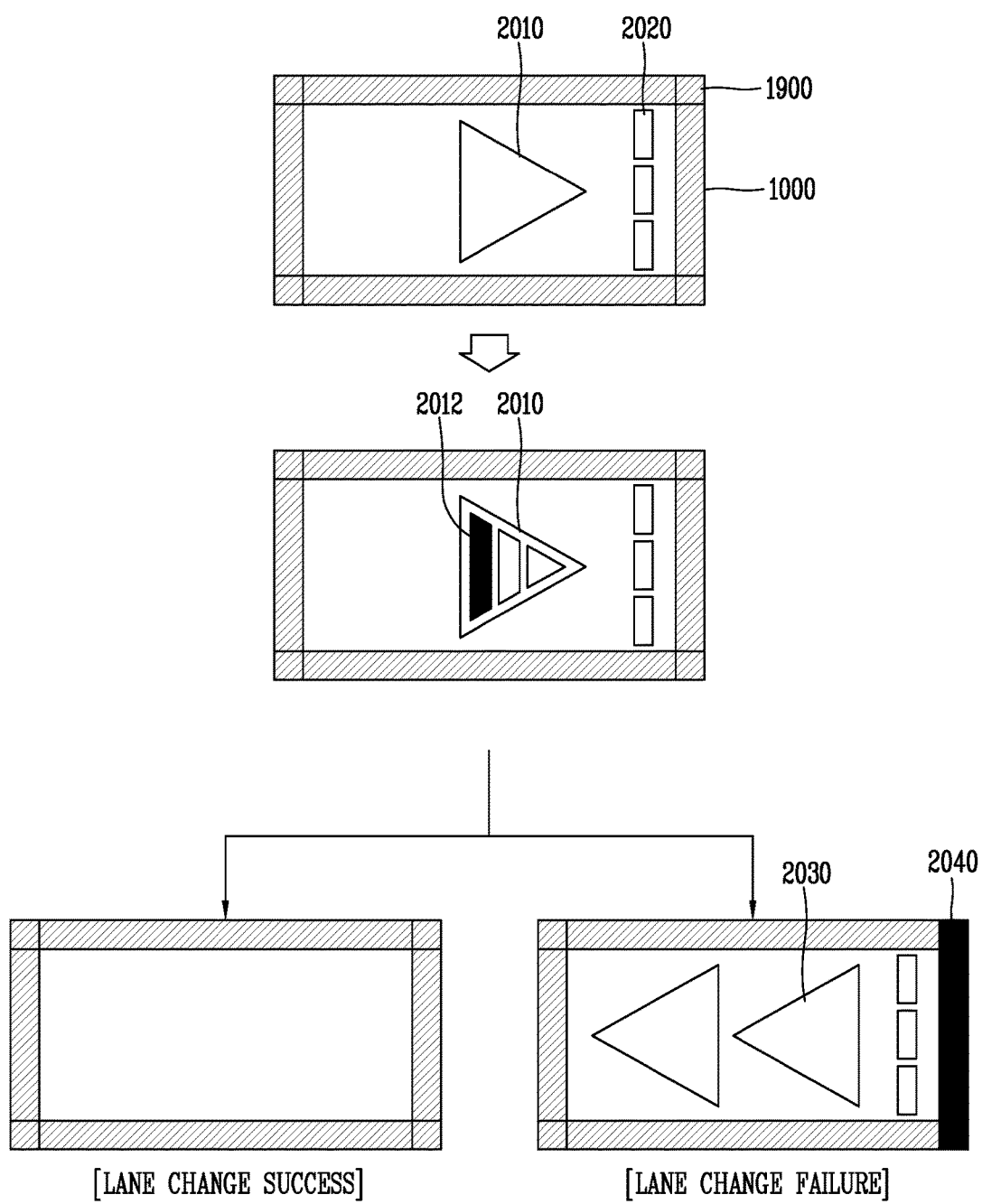

FIGS. 19 and 20 are exemplary views illustrating operations of the vehicle control device during autonomous driving.

When autonomous driving is started according to the autonomous driving mode, the driver does not have to perform driving. However, it is needed to notify the driver that the autonomous driving is executed well.

When the autonomous driving is started, the vehicle control device disclosed herein may output an autonomous driving image 1900 on the display region 1000 to notify the currently-executed autonomous driving. The autonomous driving image 1900 may be a bar-like image surrounding edges, and include an upper end image, a lower end image, a right end image and a left end image.

When an acceleration is executed by the autonomous driving, an acceleration image 1910 for guiding (notifying)

the acceleration may be output on the display module 1000 in a different manner according to an accelerated degree.

In addition, even when a deceleration is executed by the autonomous driving, a deceleration image 1920 for guiding the deceleration may be output on the display module 1000 in a different manner according to a decelerated degree.

For the deceleration, the reason of the deceleration should be notified to a passenger who has got in the vehicle. In order to guide (notify) a position of an object having collision probability, the controller 830 may process the autonomous driving image 1900 in a different manner according to the position of the object.

For example, when deceleration is caused due to an object located at the front, information indicating that the deceleration is currently executed due to the front object can be output by changing a color, size or flickering frequency of the upper image of the autonomous driving image 1900. The passenger can recognize the presence of the front object through the autonomous driving image 1900.

When a lane change or a movement from a first road to a second road is executed by the autonomous driving, a lane change image 2010 for guiding such movement may be output on the display region 1000. When a reference distance remains up to an expected point to change a lane or the second road, the lane change image 2010 is output on the display region 1000. Afterwards, as the vehicle moves, a remaining distance image 2012 for indicating a remaining distance is output on the lane change image 2010. Also, a lane image 2020 indicating the lane to change may additionally be output.

When the lane change is succeeded, the lane change image 2010, the remaining distance image 2012 and the lane image 2020 which have been output on the display region 1000 disappear from the display region 1000.

When the lane change is failed, a lane change failure image 2030 notifying the lane change failure is output. In addition, the reason of the lane change failure may be explained using the autonomous driving image 1900. For example, when the lane change is failed due to a specific object detected on the right, at least one of color, size and flickering frequency of the right end image may change in order to notify the specific object detected on the right.

Since various types of information are output on the display region of the windshield during the autonomous driving, the driver can check whether or not the autonomous driving is executed well through information output on the windshield when vehicle failure (or vehicle abnormality) is detected. Specifically, for the deceleration and the lane change, it can be intuitively checked which object causes the deceleration, to which direction the lane is to change, which object causes the failure of the lane change and the like.

Meanwhile, the application range of the present invention can extend up to a vehicle having the vehicle control device described with reference to FIGS. 8 to 19.

The present invention can be implemented as computer-readable codes (applications or software) in a program-recorded medium. The control method of the autonomous driving vehicle can be implemented by the codes stored in the memory and the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include a processor or a controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device for a vehicle, comprising:
a communicator, the communicator being configured to receive driving information regarding the vehicle;
a display, the display being configured to output visual information on a display region on a windshield of the vehicle, the display region being divided into a first region and a second region; and
a controller, the controller being configured to control the display to output on the first region of the display region one or more graphic objects guiding a path of driving of the vehicle based on the driving information,
wherein the second region occupies an upper portion of the display region and the first region occupies a lower portion of the display region such that the second region is located above the first region,
wherein the second region is larger than the first region, and
wherein the controller is configured to:
determine a collision probability with an object located outside the vehicle;
control the display to output on the first region a graphic object notifying of the collision probability when the collision probability meets a first reference; and
control the display to output on the second region the graphic object when the collision probability meets a second reference,
wherein a size of the graphic object varies according to a region in which the graphic object is displayed.

2. The device of claim 1, wherein the controller is configured to control the display to output on an edge of the second region a warning image notifying an orientation of the object with respect to the vehicle when the graphic object is outputted on the first region.

3. The device of claim 2, wherein the controller is configured to control the display to change an output position of the warning image according to a changing position of the object.

4. The device of claim 3, wherein the output position is at an upper portion of the second region when the object is located at a front of the vehicle and the output position is at a lower portion of the second region when the object is located at a rear of the vehicle.

5. The device of claim 3, wherein the controller is configured to control the display to gradually change at least one of a color, a flickering frequency, or a size of the warning image according to the collision probability.

6. The device of claim 3, wherein the controller is configured to control the display to output an additional warning image on a part of the display region that overlaps the object when the object is located within a virtual region defined by the display region and a driver's gaze.

7. The device of claim 6, wherein the controller is configured to control the display to remove the at least one of the graphic objects from the second region when the additional warning image is outputted of the display region.

8. The device of claim 1, wherein the controller is configured to control the display to output on the first region a first notification icon notifying of an event being generated in at least one application provided in the vehicle.

9. The device of claim 8, wherein the controller is configured to control the display to output on the second region a second notification icon when the event meets a predetermined condition.

10. The device of claim 9, wherein the controller is configured to control the display to remove the first notification icon from the first region when the event meets the predetermined condition.

11. The device of claim 10, wherein the at least one application comprises a forward collision warning, a blind spot detection, a lane departure warning, a pedestrian detection, a curve speed warning or a turn-by-turn navigation.

12. The device of claim 8, wherein the controller is configured to control the display to output on an edge of the second region a warning image notifying an orientation of an object with respect to the vehicle corresponding to the event when the first notification icon is outputted on the first region, and wherein the controller is configured to control the display to change an output position of the warning image according to a changing position of the object.

13. The device of claim 1, wherein the controller is configured to select the at least one of the graphic objects according to the driving information and to control the display to move the selected at least one of the graphic objects from the first region to the second region, and wherein the selected at least one of the graphic objects gradually increases in size while moving to the second region.

14. The device of claim 1, wherein the controller is configured to control the display to output on the second region a first figure image guiding a movement from a first road to a second road when the vehicle should move from the first road to the second road during movement of the vehicle towards a destination and a remaining distance from the vehicle to the second road corresponds to a reference distance, and wherein the controller is configured to control the display to output a second figure image on the first figure image in a manner of gradually obscuring the first figure image as the vehicle moves closer to the second road.

15. The device of claim 14, wherein the controller is configured to control the display such that one end of the first figure image points at a position of the second road, and the first figure image is transformed such that the one end of the first figure image continues to point at the position of the second road as the vehicle moves.

16. The device of claim 15, wherein the controller is configured to control the display to remove the first figure image from the second region or to output the at least one of the graphic objects on the first figure image when the at least one of the graphic objects is outputted on the second region.

17. The device of claim 1, wherein the display comprises:
a mirror; and
a display module configured to project the visual information towards the mirror so as to be reflected towards the windshield of the vehicle.

18. A vehicle having the vehicle control device of claim 1.

* * * * *